(12) United States Patent
Sun et al.

(10) Patent No.: US 9,319,670 B2
(45) Date of Patent: Apr. 19, 2016

(54) VIDEO DATA QUALITY ASSESSMENT METHOD AND APPARATUS

(71) Applicant: Huawei Technologies Co., Ltd., Shenzhen (CN)

(72) Inventors: Lina Sun, Shenzhen (CN); Shan Gao, Shenzhen (CN); Qingpeng Xie, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 157 days.

(21) Appl. No.: 13/954,168

(22) Filed: Jul. 30, 2013

(65) Prior Publication Data

US 2013/0314553 A1 Nov. 28, 2013

Related U.S. Application Data

(63) Continuation of application No. PCT/CN2012/073317, filed on Mar. 30, 2012.

(30) Foreign Application Priority Data

Apr. 11, 2011 (CN) .......................... 2011 1 0090022

(51) Int. Cl.
*H04N 7/12* (2006.01)
*H04N 17/00* (2006.01)
*H04N 21/44* (2011.01)

(52) U.S. Cl.
CPC ....... *H04N 17/004* (2013.01); *H04N 21/44008* (2013.01)

(58) Field of Classification Search
USPC ........ 370/252; 340/995.1; 382/239; 348/184; 725/116; 375/240.27
See application file for complete search history.

(56) References Cited

U.S. PATENT DOCUMENTS

| | | | |
|---|---|---|---|
| 7,965,203 B2* | 6/2011 | Yamagishi et al. | ........ 340/995.1 |
| 8,254,438 B2 | 8/2012 | Davis | |
| 8,339,976 B2 | 12/2012 | Gustafsson et al. | |
| 8,355,342 B2 | 1/2013 | Yamagishi et al. | |
| 8,885,050 B2* | 11/2014 | Wang et al. | ................... 348/184 |

(Continued)

FOREIGN PATENT DOCUMENTS

| | | |
|---|---|---|
| CN | 101448175 A | 6/2009 |
| CN | 101635846 A | 1/2010 |

(Continued)

OTHER PUBLICATIONS

Foreign Communication From a Counterpart Application, European Application No. 12770792.5, Extended European Search Report dated Jan. 30, 2014, 6 pages.

(Continued)

*Primary Examiner* — Gims Philippe
(74) *Attorney, Agent, or Firm* — Huawei Technologies Co., Ltd.

(57) ABSTRACT

A video data quality assessment method and apparatus are disclosed. The video data quality assessment method includes: acquiring a compression distortion parameter of video data; acquiring a frame impairment distortion parameter/video data rebuffering parameter; and calculating a video quality parameter according to the compression distortion parameter and the frame impairment distortion parameter/video data rebuffering parameter, where the video quality parameter is a difference between the compression distortion parameter and the frame impairment distortion parameter/video data rebuffering parameter.

27 Claims, 21 Drawing Sheets

(56) References Cited

U.S. PATENT DOCUMENTS

| | | | |
|---|---|---|---|
| 8,917,777 B2* | 12/2014 | Xie et al. | 375/240.27 |
| 2007/0019873 A1* | 1/2007 | Tzannes et al. | 382/239 |
| 2008/0025400 A1 | 1/2008 | Sugimoto et al. | |
| 2008/0291842 A1* | 11/2008 | Isambart et al. | 370/252 |
| 2008/0317111 A1 | 12/2008 | Davis | |
| 2009/0138932 A1* | 5/2009 | Bauchot et al. | 725/116 |
| 2009/0244289 A1 | 10/2009 | Raake et al. | |
| 2010/0008241 A1 | 1/2010 | Gustafsson et al. | |
| 2010/0166388 A1 | 7/2010 | Ushiki | |
| 2010/0284295 A1 | 11/2010 | Yamagishi et al. | |
| 2011/0085605 A1 | 4/2011 | Xie et al. | |
| 2012/0020415 A1 | 1/2012 | Yang et al. | |
| 2013/0162841 A1 | 6/2013 | Gustafsson et al. | |

FOREIGN PATENT DOCUMENTS

| | | |
|---|---|---|
| CN | 101790107 A | 7/2010 |
| JP | 2007019802 A | 1/2007 |
| JP | 2008301026 A | 12/2008 |
| JP | 2009044393 A | 2/2009 |
| JP | 2009518915 A | 5/2009 |
| JP | 2009188969 A | 8/2009 |
| JP | 2009273010 A | 11/2009 |
| JP | 2009273013 A | 11/2009 |
| JP | 2010507324 A | 3/2010 |
| JP | 2011015165 A | 1/2011 |
| JP | 2011510562 A | 3/2011 |
| KR | 1020090014721 A | 2/2009 |
| KR | 20100095455 A | 8/2010 |
| KR | 101008608 B1 | 1/2011 |
| WO | 2008048155 A1 | 4/2008 |

OTHER PUBLICATIONS

Xiangchun, T., et al., "Perceived Video Streaming Quality under Initial Buffering and Rebuffering Degradations," XP055097502, Jun. 5, 2006, 8 pages.

Raake, A., et al., "T-V-Model: Parameter-Based Prediction of IPTV Quality," IEEE International Conference on Acoustics, Speech and Signal Processing, XP031250760, Mar. 31, 2008, pp. 1149-1152.

Fuzheng, Y., et al., "No-Reference Quality Assessment for Networked Video Via Primary Anaysis of Bit Stream," IEEE Transactions on Circuits and Systems for Video Technology, vol. 20, No. 11, XP011319799, Nov. 1, 2010, pp. 1544-1554.

Foreign Communication From a Counterpart Application, PCT Application PCT/CN2012/073317, Chinese Search Report dated Jul. 19, 2012, 8 pages.

Foreign Communication From a Counterpart Application, PCT Application PCT/CN2012/073317, Chinese Written Opinion dated Jul. 19, 2012, 7 pages.

Garcia, et al., "Impairment-Factor-Based Audio-Visual Quality Model for IPTV," Proceedings of International Workshop on Quality of Multimedia Experience (QoMEX 2009), Jul. 29-31, 2009, pp. 1-6.

"Series H: Audiovisual and Multimedia Systems, Infrastructure of Audiovisual Services—Coding of Moving Video, Advance Video Coding for Generic Audiovisual Services," ITU-T, Telecommunication Standardization Sector of ITU, H.264, Mar. 2010, 676 pages.

Series H: Audiovisual and Multimedia Systems, Infrastructure of Audiovisual Services—Transmission Multiplexing and Synchronization, Information Technology—Generic Coding of Moving Pictures and Associated Audio Information: Systems, ITU-T, Telecommunication Standardization Sector of ITU, H.222.0, May 2006, 190 pages.

"Information Technology—Coding of Audio-Visual Objects—Part 2: Visual," International Standard, ISO/IEC 14496-2, Second Edition, Dec. 1, 2001, 536 pages.

Kikuchi, Y., et al., "RTP Payload Format for MPEG-4 Audio/Visual Streams," RFC 3016, Nov. 2000, 23 pages.

Wenger, S., et al., "RTP Payload Format for H.264 Video," RFC 3984, Feb. 2005, 84 pages.

* cited by examiner

VIDEO DATA QUALITY ASSESSMENT METHOD AND APPARATUS

CROSS-REFERENCE TO RELATED APPLICATION

This application is a continuation of International Application No. PCT/CN2012/073317, filed on Mar. 30, 2012, which claims priority to Chinese Patent Application No. 201110090022.8, filed on Apr. 11, 2011, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the field of digital signal processing technologies, and in particular, to a video data quality assessment method and apparatus.

BACKGROUND

With the development of network technologies, services such as video-on-demand, network television, and viewphone have become main services of a broadband network, and these services will become main services of a 3rd generation (3G) wireless network. In order to reduce resources occupied during a storage or transmission process of a video signal, compression processing is performed on the video signal at a sending end and then the video signal is transmitted to a receiving end, and the receiving end recovers the video signal through decompression processing and then plays the video signal.

Network video quality is influenced by many complex factors, such as service quality of a transmission channel, an adaptation condition between a parameter at a video encoding/decoding end and the transmission channel, where different positions loss in the video data loss occurred due to a channel packet loss, a delay, or the like, impact the video subjective quality greatly; and a video rebuffering or jitter caused by a channel delay and jitter. In order to ensure service quality of a network video, quality of a network video service needs to be monitored, so as to take corresponding measures in time to perform adjustment and maintenance, and ensure a normal operation of the video service.

A network video quality assessment is an indispensable and important technology in a network video application. However, a subjective quality assessment performed by observing with human eyes consumes time and energy, and is obviously infeasible for the network video application. Even most general and objective video quality assessment methods are not applicable to an application environment of the network video. According to degrees of demands on an original reference video, an objective video quality assessment method in the prior art is generally divided into three kinds: full reference, reduced reference, and no reference objective video quality assessments.

In an actual product application, algorithmic complexity is a factor that needs to be considered. Real-time monitoring and assessment need to be supported and performed on a terminal device (a network device or a test device) with a low computational capability. Due to the limitation of a channel bandwidth, a video receiving end usually cannot obtain a required reference video sequence, and generally, a video stream transmitted in the network needs to be assessed by using the no reference video quality assessment method.

A no reference video quality assessment model may assess quality of the video stream by using network information, a network data packet, and information of the video stream itself. If the video stream can be parsed completely, the assessment is relatively accurate. However, because the parsing of the video stream is of high complexity, the video quality assessment cannot be performed in real time or is not applicable to the terminal device (the network device or the test device) with a low computational capability.

In a video quality assessment method, influences of encoding quality $Qual_{encoding}$, a video rebuffering $Qual_{buff}$, and a network packet loss $Qual_{pl}$ are considered in video quality $TOT\_MOS_{pred}$:

$$TOT\_MOS_{pred} = func(Qual_{encoding}, Qual_{buff}, Qual_{pl}).$$

Influences of a bit stream x and an encoding type are considered in the encoding quality:

$$Qual_{encoding} = c_0 - c_1 \cdot e^{-\lambda \cdot x},$$

where $c_0$, $c_1$, and $\lambda$ are constants, and may have different values under different encoding formats.

The network packet loss quality is calculated by using a packet loss rate, and an average packet loss rate in a sliding window is calculated first:

$$PLR_{mean} = \frac{1}{N} \cdot \sum_{i=1}^{N} PLR_i.$$

Maximum packet loss rates $PLR_u$ and $PLR_l$ are preset; if the packet loss rate in the sliding window is greater than $PLR_u$, it is considered that the video quality is the worst, and if the packet loss rate is less than $PLR_l$, it is considered that the packet loss at this time has no influence on the video quality:

$$PLR_l = \min(PLR_l, PLR_u), \text{ and } PLR_u = \max(PLR_l, PLR_u).$$

Quality of a packet loss in a period of time is:

$$Qual_{pl} = const \cdot (Qual_{encoding} - 1) \cdot \xi + 1$$

$$\xi = \frac{PLR_u - PLR_{mean}}{PLR_u - PLR_l}, 0 \leq \xi \leq 1.$$

Influences of the number of video rebufferings in a period of time, a re-buffering duration, and an initial buffering duration are considered in the influence quality of the video rebuffering, and a model is as follows:

$$Qual_{buff} = C_0 + C_1 \cdot INIT\_PERC + C_2 \cdot BUF\_PERC + C_3 \cdot BUF\_FRQ.$$

Final video quality is:

$$TOT\_MOS_{pred} = Qual_{pl} - Qual_{buff}.$$

In the foregoing video quality assessment method, a packet loss rate is calculated by using packet header information of a real-time transport protocol (RTP) packet, and video quality is calculated by using the packet loss rate, thereby reducing complexity; because only the packet loss rate is considered in the method, the calculation is simple but accuracy is low.

SUMMARY

According to an embodiment of the present invention, a video data quality assessment method includes: acquiring a compression distortion parameter of video data; acquiring a frame impairment distortion parameter; and calculating a video quality parameter according to the compression distortion parameter and the frame impairment distortion parameter, where the video quality parameter is a difference between the compression distortion parameter and the frame impairment distortion parameter.

According to another embodiment of the present invention, a video data quality assessment method includes: acquiring a compression distortion parameter of video data; acquiring a video data rebuffering parameter; and calculating a video quality parameter according to the compression distortion parameter and the video data rebuffering parameter, where the video quality parameter is a difference between the compression distortion parameter and the video data rebuffering parameter.

According to another embodiment of the present invention, a video data quality assessment apparatus includes: a compression distortion calculation unit configured to acquire a compression distortion parameter of video data; a frame impairment distortion calculation unit configured to acquire a frame impairment distortion parameter; and a combination unit configured to calculate a video quality parameter according to the compression distortion parameter and the frame impairment distortion parameter, where the video quality parameter is a difference between the compression distortion parameter and the frame impairment distortion parameter.

A video quality assessment model provided in the present solution does not need to parse a video bit stream payload, but assesses a video stream only by using packet header information of a data packet, so that calculation complexity is low, and assessment can be implemented in real time. Meanwhile, a feature which is of a video and is different from a feature of a common transmitted data packet is further taken into consideration, so a result is more accurate than that obtained by directly using a packet loss rate of the data packet during a packet loss influence calculation.

BRIEF DESCRIPTION OF THE DRAWINGS

To describe the technical solutions in the embodiments of the present invention more clearly, the following briefly introduces accompanying drawings required for describing the embodiments. Apparently, the accompanying drawings in the following description show merely some embodiments of the present invention, and persons of ordinary skill in the art may further obtain other drawings according to the accompanying drawings without creative efforts.

DETAILED DESCRIPTION

The following clearly describes the technical solutions in the embodiments of the present invention with reference to the accompanying drawings in the embodiments of the present invention. Apparently, the embodiments to be described are merely a part rather than all of the embodiments of the present invention. All other embodiments obtained by persons of ordinary skill in the art based on the embodiment of the present invention without creative efforts shall fall within the protection scope of the present invention.

A no reference video quality assessment model may assess quality of a video stream by using network information, a network data packet, and information of the video stream itself. If the video stream can be parsed completely, the assessment is relatively accurate. However, because the parsing of the video stream is of high complexity, the video quality assessment cannot be performed in real time or is not applicable to a terminal device (a network device or a test device) with a low computational capability.

A video quality assessment model provided in the present solution does not need to parse a video bit stream payload, but assesses the video stream only by using packet header information of a data packet, so that complexity is greatly reduced, and assessment can be implemented in real time. Meanwhile, a feature which is of a video and is different from a feature of a common transmitted data packet is further taken into consideration, so a result is more accurate than that obtained by directly using a packet loss rate of the data packet during a packet loss influence calculation.

Figure 1A:
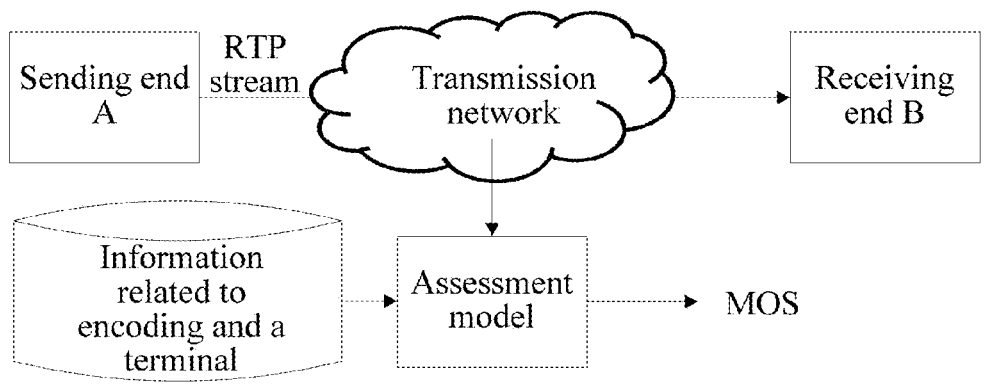
FIGS. 1A to 1E show several main application scenarios of embodiments of the present invention.
Figure 1B:
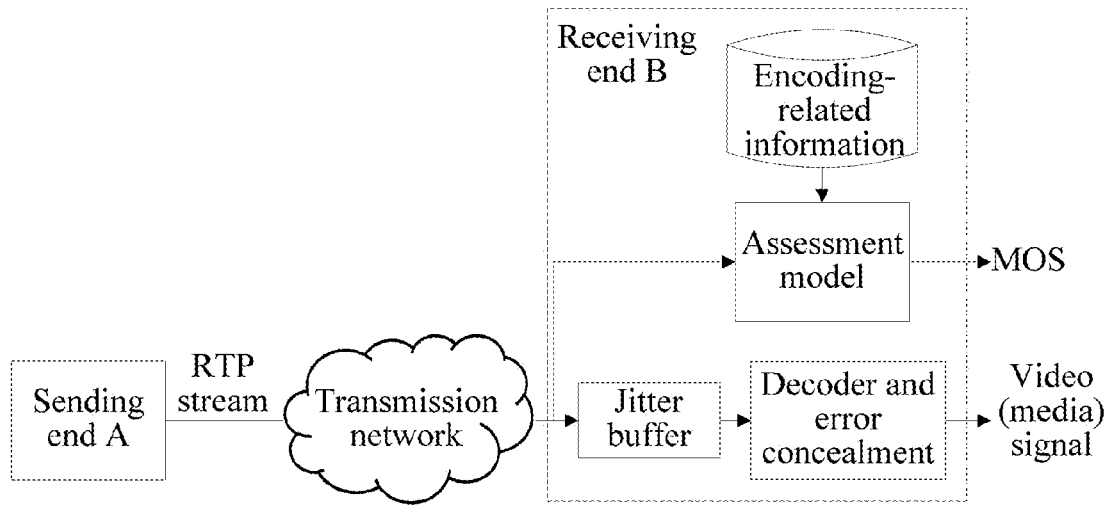
Figure 1C:
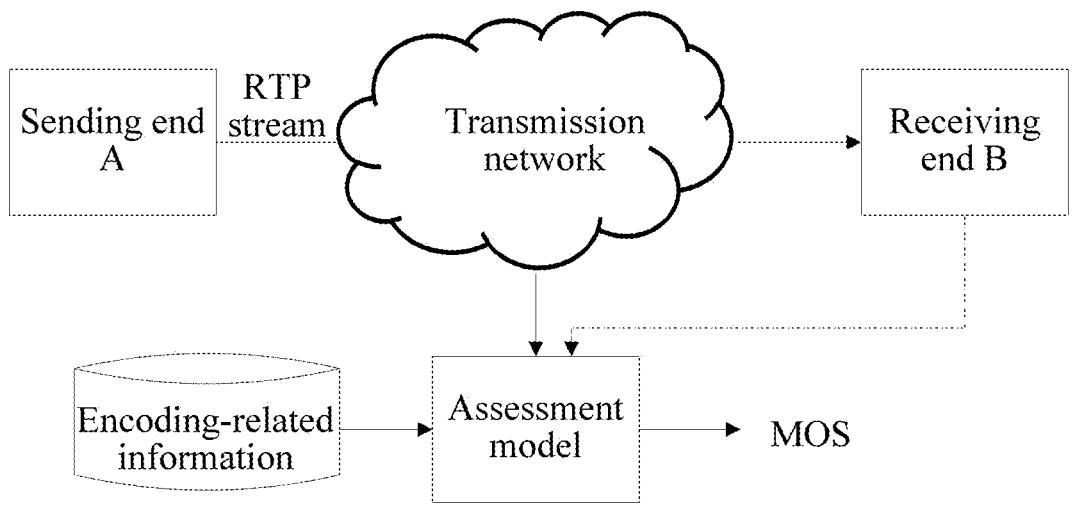
Figure 1D:
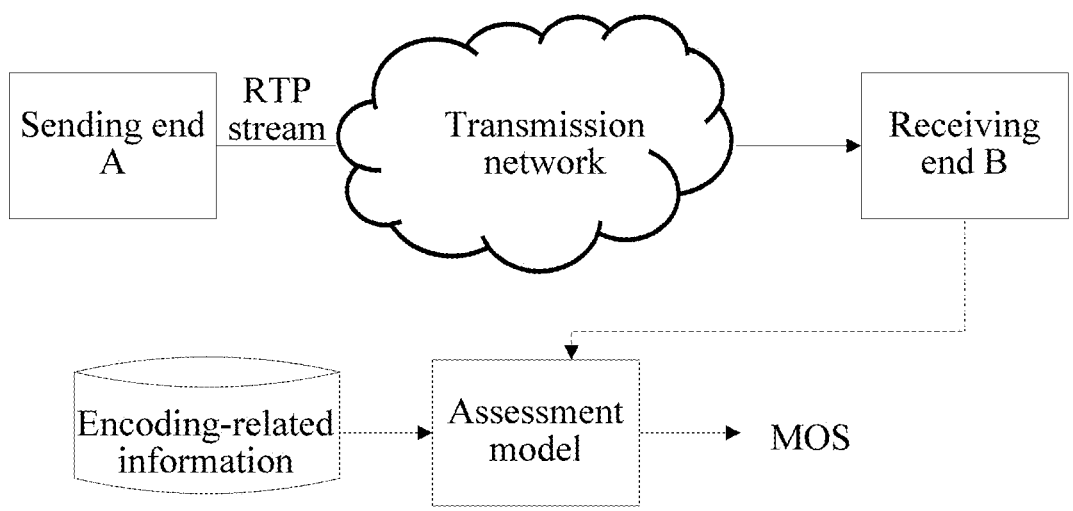
Figure 1E:
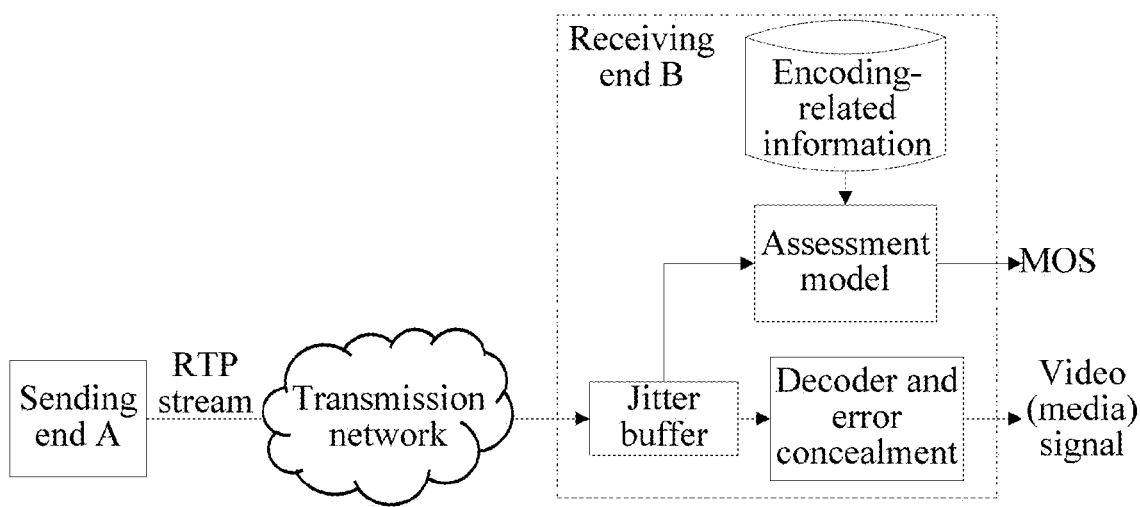

Referring to FIGS. 1A to 1E, several main application scenarios of the present invention are shown. A video RTP stream sent by a sending end passes through a transmission network, and video quality monitoring may be performed at a network intermediate node and a receiving end. Video quality monitoring in FIG. 1A is deployed in a network, and network transmission layer information, predicted encoding information and terminal information are input; video quality monitoring in FIG. 1B is deployed at a terminal, and network transmission layer information, predicted encoding information and terminal information are input; video quality monitoring in FIG. 1C is deployed in a network, and network transmission layer information, predicted encoding information, and information obtained through collecting statistics by a terminal and fed back through a protocol are input; video quality monitoring in FIG. 1D is deployed in a network, but what is input is network transmission layer information obtained through collecting statistics by a terminal and fed back through a protocol, information obtained through collecting statistics by the terminal, and predicted encoding information; and video quality monitoring in FIG. 1E is deployed at a terminal, and network transmission layer information, terminal information, and predicted encoding information are input.

A video assessment model provided in the present solution includes three parts, namely, a compression distortion model, a packet loss distortion model, and a rebuffering influence model. Compression distortion is distortion caused due to video encoding compression, and compression distortion quality is basic quality when different video streams are encoded into different bit rates in a case of different encoding types; and packet loss distortion is bit error distortion and bit error propagation distortion that are caused by an impairment of a video frame, where the impairment of the video frame is caused by a delay packet loss due to a loss or jitter of a video stream data packet transmitted in a network channel. A distortion degree and a distortion value depend on basic quality of encoding; and rebuffering influence is caused because the number of video frames in a playing terminal buffer is less than an underflow threshold, which is specifically manifested as that the display time of one frame of an image is too long. The rebuffering influence model and the packet loss distortion model are two independent parts, and may be calculated separately.

Video data quality MOS_V may be relevant to a compression distortion parameter $Q_{encoding}$, a frame impairment distortion parameter $Q_{framedistortion}$, and a rebuffering distortion parameter $Q_{rebuffer}$. MOS_V may be represented as:

$$MOS\_V=func(Q_{encoding}, Q_{framedistortion}, Q_{rebuffer})  \quad \text{Formula (1)}.$$

Specific video data quality may be obtained in different manners. In one manner, the video quality parameter is a difference between the compression distortion parameter and the frame impairment distortion parameter; in another manner, the video quality parameter is a difference between the compression distortion parameter and a video data rebuffering parameter; in another manner, the video quality parameter is a difference obtained by subtracting the frame impairment distortion parameter and then subtracting the video data rebuffering parameter from the compression distortion parameter. That is, the video data quality is calculated through one of the following formulas:

$$MOS\_V=Q_{encoding}-Q_{framedistortion},$$

$$MOS\_V=Q_{encoding}-Q_{rebuffer}, \text{ or}$$

$$MOS\_V=Q_{encoding}-Q_{framedistortion}-Q_{rebuffer}.$$

Figure 2:
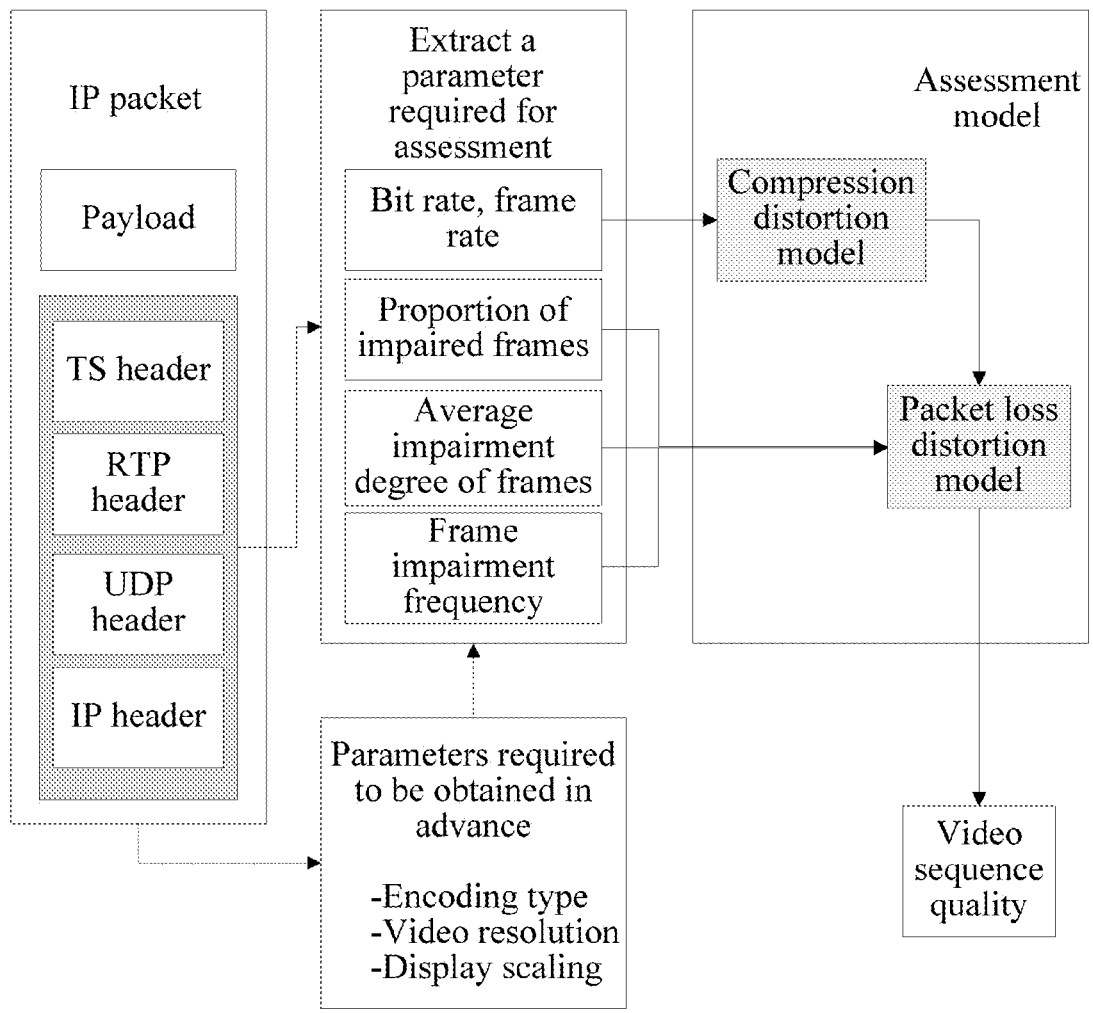
FIG. 2 is a schematic diagram of a calculation model of a video data quality assessment method according to the present invention.

Referring to FIG. 2, by using packet header information of an Internet Protocol (IP) data packet and with reference to pre-obtained parameter information, a directly input parameter required for assessment is deduced, a compression distortion parameter and a packet loss distortion parameter are calculated, and final video sequence quality is obtained. In an embodiment, a compression distortion parameter of video data is obtained; a frame impairment distortion parameter is obtained; and a video quality parameter is calculated according to the compression distortion parameter and the frame impairment distortion parameter, where the video quality parameter is a difference between the compression distortion parameter and the frame impairment distortion parameter. The video sequence quality is obtained by subtracting the frame impairment distortion parameter from the compression distortion parameter of the video data.

$$Q_{sequence}=Q_{encoding}-Q_{framedistortion} \quad \text{Formula (2)}$$

Figure 3:
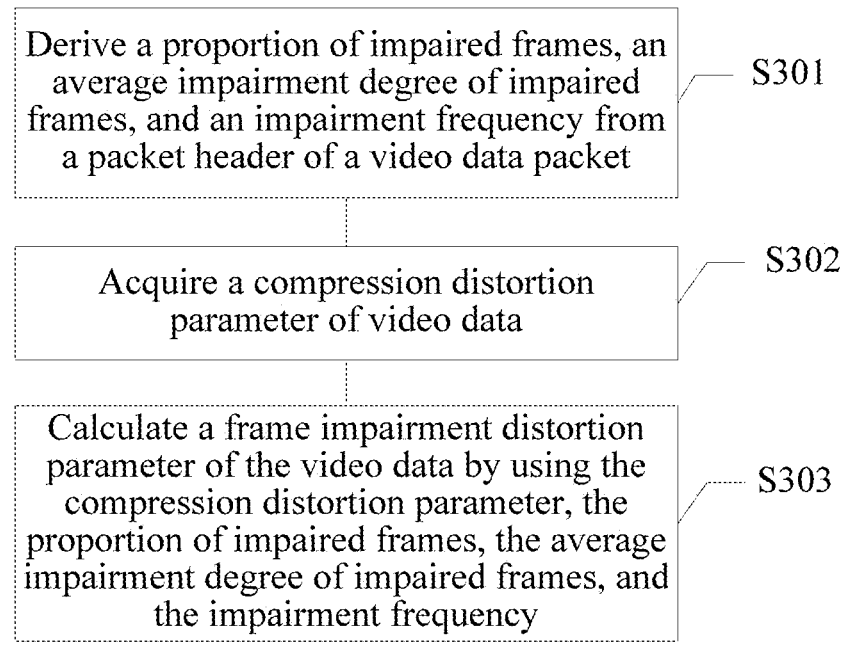
FIG. 3 shows an embodiment of a video data quality assessment method according to the present invention.

Referring to FIG. 3, an embodiment of a video data quality assessment method in the present invention is shown, which includes:

S301: Derive a proportion of impaired frames, an average impairment degree of impaired frames, and an impairment frequency from a packet header of a video data packet.

In the video data quality assessment method, distortion caused by a frame impairment is calculated. First, a frame boundary needs to be obtained according to a Marker bit of an RTP data packet or a payload_unit_start_indicator bit of a transport stream (TS) packet, an impairment condition of each video frame is obtained according to information such as a timestamp and a sequence number of the data packet, and at the same time, a frame type (an intra-coded/instantaneous decoder refresh (I/IDR) frame, a predicted (P) frame, a bi-predictive (B) frame, and a non-I/IDR scenario switching frame) is inferred according to a frame size (an encoded data amount), and the following information is obtained through collecting statistics:

(1) the proportion (x) of impaired frames: a proportion of the number of impaired frames (including a frame with a packet loss and a frame affected due to bit error propagation) to the total number of frames in a sequence that needs to be graded;

(2) the average impairment degree (y) of impaired frames: an average impairment proportion of the impaired frames; and (3) the impairment frequency (FLF) in a period of time: the impairment frequency is also referred to as a frequency of a packet loss event, that is, the number of packet loss events in a fixed duration; where distortion of a packet loss event ends at I/IDR or a scenario switching frame; when a distortion ending boundary cannot be known in some application scenarios, an adjacent impaired frame is counted into one impairment, and for the impairment frequency, statistics about the number of impairments in a period of time may be directly collected.

S302: Acquire a compression distortion parameter of video data.

The compression distortion parameter of the video data indicates that video basic quality of video encoding compression distortion is taken into consideration, and the parameter may be obtained through multiple methods, for example, a calculation method in the prior art may be used, and the method described below in this embodiment may also be used.

S303: Calculate a frame impairment distortion parameter of the video data by using the compression distortion parameter, the proportion of impaired frames, the average impairment degree of impaired frames, and the impairment frequency, where the frame impairment distortion parameter is between 0 and a difference between the compression distortion parameter and a minimum quality value, and the video frame impairment distortion parameter decreases to the minimum quality value as any one of the proportion of impaired frames, the average impairment degree of impaired frames, and the impairment frequency increases.

In an embodiment, the frame impairment distortion parameter of the video data is calculated through the following formula:

$$Q_{framedistortion} = (Q_{encoding} - a_1) \times f(x, y, FLF) \quad \text{Formula (3)}.$$

In Formula (3), $a_1$ represents minimum quality (for example, if the grading is a five-grade rating system, the minimum quality may be 1) of a video sequence; $f(x, y, FLF)$ represents a function formed by the proportion of impaired frames, the average impairment degree of impaired frames, and the impairment frequency, where the function satisfies a relationship of $0 \leq f(x, y, FLF) < 1$, and its value increases and is infinitely close to 1 as a value of any variable of the proportion of impaired frames, the average impairment degree of impaired frames, and the impairment frequency increases. That is, when x, y or FLF is small, distortion is invisible, and when x, y or FLF increases to a certain degree, a mark directly falls to the lowest. A specific calculation formula may be any form satisfying the foregoing rules. $f(x, y, FLF, \sigma)$ may be a quadratic polynomial formed by x, y, FLF, $\sigma$, or a combination of a power function or a combination of an exponential function.

In an embodiment, $f(x, y, FLF)$ may be calculated by using the following formula:

$$f(x, y, FLF) = \frac{\left(\frac{x \cdot y}{a_4}\right)^{b_4} \cdot \left(\frac{FLF}{a_5}\right)^{b_5}}{1 + \left(\frac{x \cdot y}{a_4}\right)^{b_4} \cdot \left(\frac{FLF}{a_5}\right)^{b_5}}. \quad \text{Formula (4)}$$

In Formula (4), $a_1, a_4, b_4, a_5, b_5$ are constants, and have different values under different encoding types, video resolutions (and display scaling), and video content categories. A specific physical meaning is described as follows:

$a_4$: represents a subjectively acceptable video content impairment proportion;

$b_4$: represents a sensitivity degree of a subjective sense of the human eyes toward the video of this type to the video content impairment proportion;

$a_5$: represents a subjectively acceptable impairment frequency; and $b_5$: represents a sensitivity degree of a subjective sense of the human eyes toward the video of this type to the impairment frequency.

Particularly, when a video content category cannot be known, the foregoing parameter values may use statistical default values.

In some application scenarios, for example, when a computational capability of a terminal device (a network device or a test device) is too low, an operating result of each formula involved in this embodiment may be replaced through table look-up.

In other embodiments, $f(x, y, FLF)$ may be calculated by using the following formulas separately:

$$f(x, y, FLF) = \quad \text{Formula (5)}$$
$$(a_4 \cdot (x \cdot y)^2 + b_4 \cdot x \cdot y + c_4) \cdot (a_5 \cdot FLF^2 + b_5 \cdot FLF + c_5),$$
where
$a_4, b_4, c_4, a_5, b_5, c_5$ are constants;

$$f(x, y, FLF) = (a_4 \cdot x^2 + b_4 \cdot x + c_4) \cdot \quad \text{Formula (6)}$$
$$(a_5 \cdot y^2 + b_5 \cdot y + c_5) \cdot (a_6 \cdot FLF^2 + b_6 \cdot FLF + c_6),$$
where
$a_4, b_4, c_4, a_5, b_5, c_5, a_6, b_6, c_6$ are constants;

$$f(x, y, FLF) = \left(\frac{x \cdot y}{a_4}\right)^{b_4} \cdot \left(\frac{FLF}{a_5}\right)^{b_5} \quad \text{Formula (7)}$$

or $$f(x, y, FLF) = (a_4 \cdot e^{(b_4 \cdot x \cdot y)}) \cdot (a_5 \cdot e^{(b_5 \cdot FLF)}),$$
where
$a_4, b_4, a_5, b_5$ are constants;
and $$f(x, y, FLF) = \left(\frac{x}{a_4}\right)^{b_4} \cdot \left(\frac{y}{a_5}\right)^{b_5} \cdot \left(\frac{FLF}{a_6}\right)^{b_6} \quad \text{Formula (8)}$$

or $$f(x, y, FLF) = (a_4 \cdot e^{(b_4 \cdot x)}) \cdot (a_5 \cdot e^{(b_5 \cdot y)}) \cdot (a_6 \cdot e^{(b_6 \cdot FLF)}),$$
where
$a_4, b_4, a_5, b_5, a_6, b_6$ are constants.

Further, in some application scenarios, for a video stream encoded through the H.264 protocol, if information related to a Network Abstraction Layer (NAL) header can be parsed, complexity is not increased too much, and information about whether the frame is a reference frame can be exactly obtained; then, the frame type and a packet loss distribution condition may be inferred more accurately with reference to the frame size.

A video quality assessment model provided in the present solution does not need to parse a video bit stream payload, but assesses the video stream only by using packet header information of a data packet, so that complexity is greatly reduced, and assessment can be implemented in real time. Meanwhile, a feature which is of a video and is different from a feature of a common transmitted data packet is further taken into consideration, so a result is more accurate than that obtained by directly using a packet loss rate of the data packet during a packet loss influence calculation.

Figure 4:
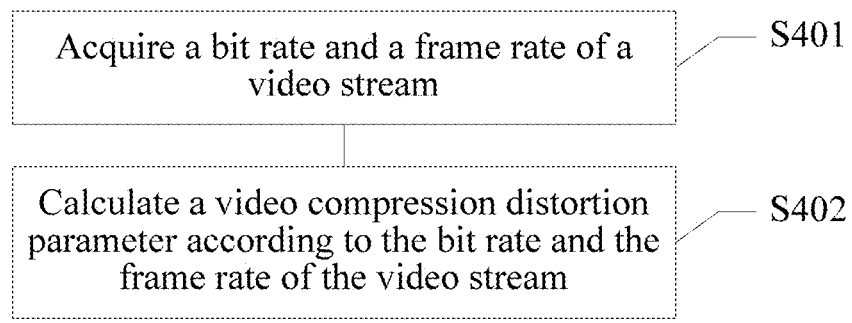
FIG. 4 is a schematic flow chart of an embodiment of acquiring a compression distortion parameter of video data according to the present invention.

Referring to FIG. 4, an embodiment of acquiring a compression distortion parameter of video data is shown, which includes:

S401: Acquire a bit rate and a frame rate of a video stream.

In a case that an encoding type, a video resolution (and display scaling), and a video content category are known, the bit rate and the frame rate of the video stream are calculated according to information such as a data amount of a data packet per second and a timestamp, or may be obtained in a channel information transmission manner.

S402: Calculate a video compression distortion parameter according to the bit rate and the frame rate of the video stream, where the compression distortion parameter increases to a maximum value as the bit rate increases; and under a certain bit rate, the compression distortion parameter slightly decreases as the frame rate increases.

In an embodiment, the video compression distortion parameter is calculated according to the following formula:

$$Q_{encoding} = a_1 + a_2 \cdot e^{-\frac{a_3}{func(Fr,Br)}}. \quad \text{Formula (9)}$$

In Formula (9), Fr represents the frame rate, Br represents the bit rate, $a_1$, $a_2$, $a_3$ are constants and have different values under different encoding types, video resolutions (and display scaling), and video content categories. For example, the video compression distortion parameter adopts a five-grade rating system, $a_1$ is generally 1, and $a_2$ is relevant to a resolution and display scaling. Generally, the smaller the resolution is, the smaller $a_2$ is; and when the resolution becomes larger, $a_2$ may be close to or equal to 4. A value of $a_3$ mainly coordinates with func(Fr,Br), and is specifically relevant to the encoding type and the video resolution. A specific physical meaning is described as follows:

$a_1$: represents minimum quality (for example, if the grading is a five-grade rating system, the minimum quality may be 1) of a video sequence;

$a_1+a_2$: represents maximum quality that the video sequence can reach, and its value is relevant to the resolution (and the display scaling) (for example, if the grading is a five-grade rating system, the maximum quality may be 5);

$a_3$: a compression distortion decrease factor under a specific encoding type, a specific video resolution (and display scaling), a specific frame rate, and a specific video content category; and func(Fr,Br): an adjustment made to the bit rate under a non-specific frame rate, where func(Fr,Br) increases as Br increases, and increases as Fr decreases; if the frame rate decreases to half of a specific frame rate, quality of a video single frame encoded under a same bit rate increases, but the video quality decreases due to time domain distortion; this formula may be a linear model, a nonlinear model, or a combination of a linear model and a nonlinear model.

Particularly, when the video content category cannot be known, the foregoing parameter values may use statistical default values (for example, an average of parameter values of different kinds or a parameter value of a specific kind).

In some application scenarios, for example, when a computational capability of a terminal device (a network device or a test device) is too low, an operating result of each formula involved in this embodiment may be replaced through table look-up.

Figure 5:
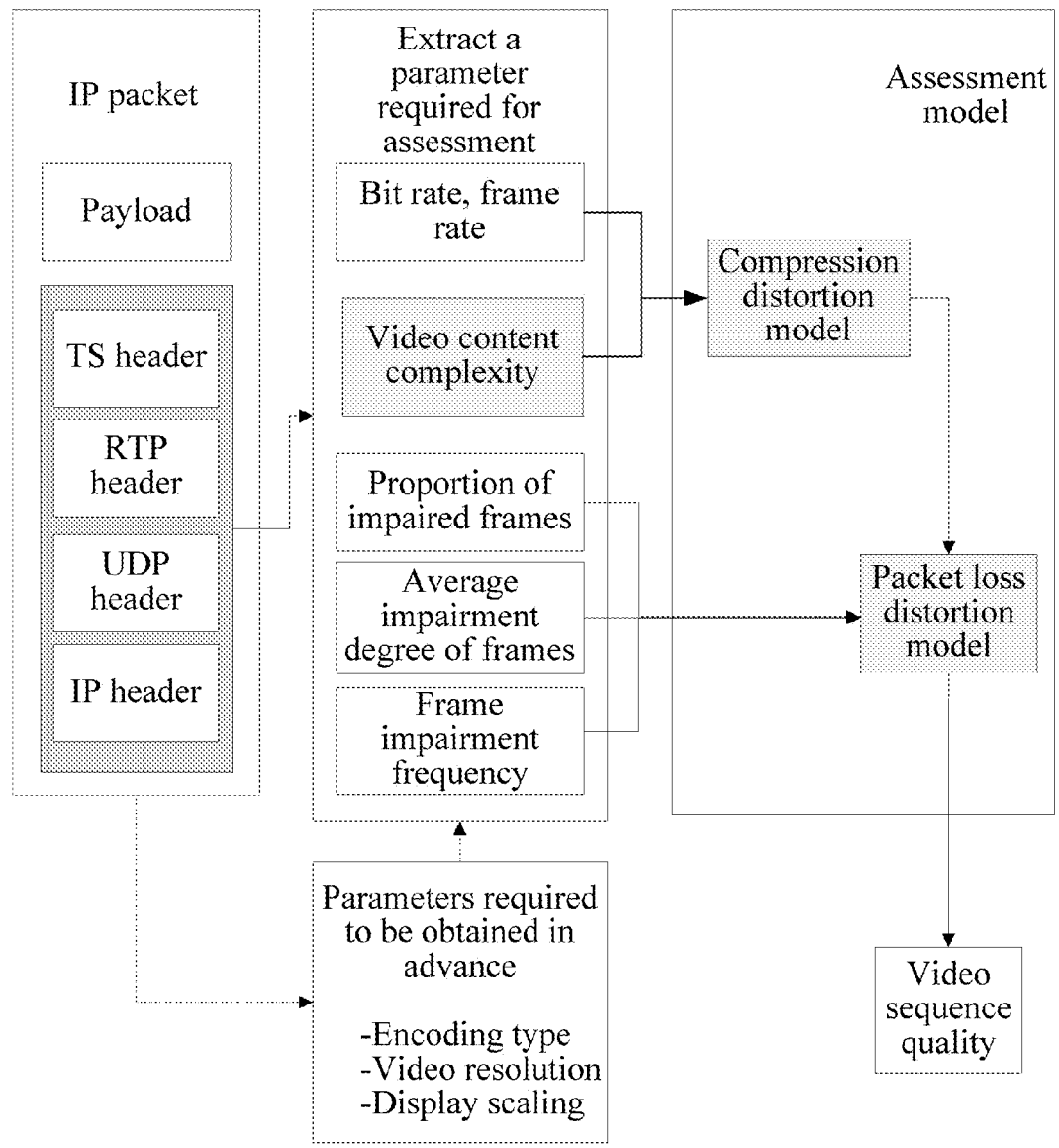
FIG. 5 is a schematic diagram of another calculation model of a video data quality assessment method according to the present invention.

Referring to FIG. 5, when video content category information cannot be obtained in advance or a category is not precise enough, in order to obtain more accurate compression distortion quality, video content complexity (which is represented by λ; the video content complexity provided in this embodiment is used to represent a complexity degree of video encoding, and is a uniform descriptor with reference to temporal complexity and spatial complexity of a video, that is, content complexity of a video, with a strenuous motion or referred to as high temporal complexity and rich space details or referred to as high spatial complexity, is relatively high; while content complexity of a video, with a mild motion or referred to as low temporal complexity and simple space details or referred to as low spatial complexity, is relatively low) precisely representing different video content may be calculated first, and then calculation is performed with reference to the model of the first embodiment of the compression distortion parameter.

Figure 6:
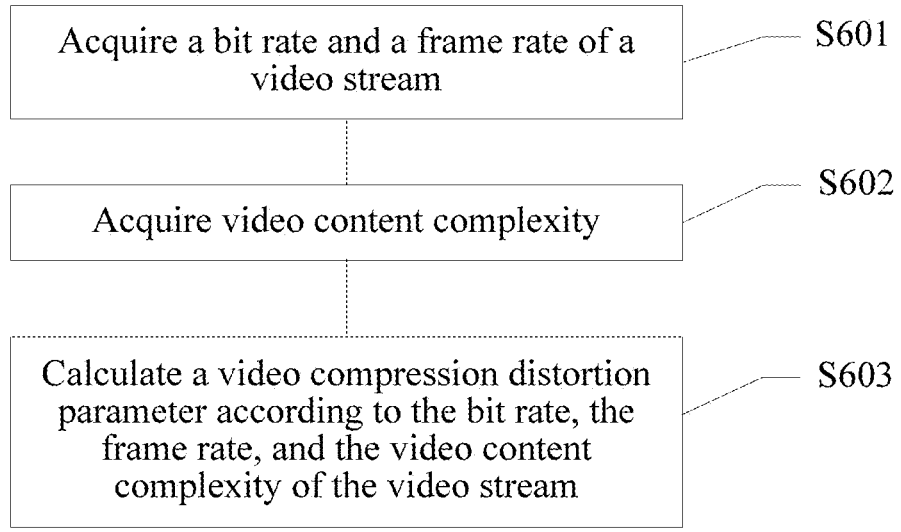
FIG. 6 is a schematic flow chart of another embodiment of acquiring a compression distortion parameter of video data according to the present invention.

Referring to FIG. 6, an embodiment of acquiring a compression distortion parameter of video data is shown, which includes:

S601: Acquire a bit rate and a frame rate of a video stream.

In a case that an encoding type, a video resolution (and display scaling), and a video content category are known, the bit rate and the frame rate of the video stream are calculated according to information such as a data amount of a data packet per second and a timestamp, or may be obtained in a channel information transmission manner.

S602: Acquire video content complexity.

S603: Calculate a video compression distortion parameter according to the bit rate, the frame rate, and the video content complexity of the video stream, where the compression distortion parameter increases to a maximum value as the bit rate increases; and under a certain bit rate, the compression distortion parameter slightly decreases as the frame rate increases, and decreases as the video content complexity increases.

In an embodiment, the video compression distortion parameter is calculated according to the following formula:

$$Q_{encoding} = a_1 + a_2 \cdot e^{-\frac{func(\lambda)}{func(Fr,Br)}}. \quad \text{Formula (10)}$$

In Formula (10), $a_1$, $a_2$ are constants, and the details are the same as those in the first embodiment of the compression distortion parameter. func(λ) is a function relevant to the video content complexity, and its value increases as λ increases, where a specific presentation form may be a linear form, a nonlinear form, or a combination of a linear form and a nonlinear form.

When a video content complexity λ in a video stream is changed, an average of values of λ in adjacent video segments (which are divided by a bit error ending boundary, and generally, one group of pictures (GOP) is one video segment) with similar λ values is used for calculation, and combination is further performed to obtain a mark of the whole video stream.

Specifically, there may be two methods for calculating the video content complexity.

In a first method, after a statistical analysis experiment on a large amount of bit stream data, it is found that a ratio R of an encoding rate Br to the number of I-frame encoding bits $R_I$ (or the average number of I-frame encoding bits of multiple video segments) may reflect a video content feature to a certain degree.

$$R = Br/Rr \quad \text{Formula (11)}$$

Figure 7:
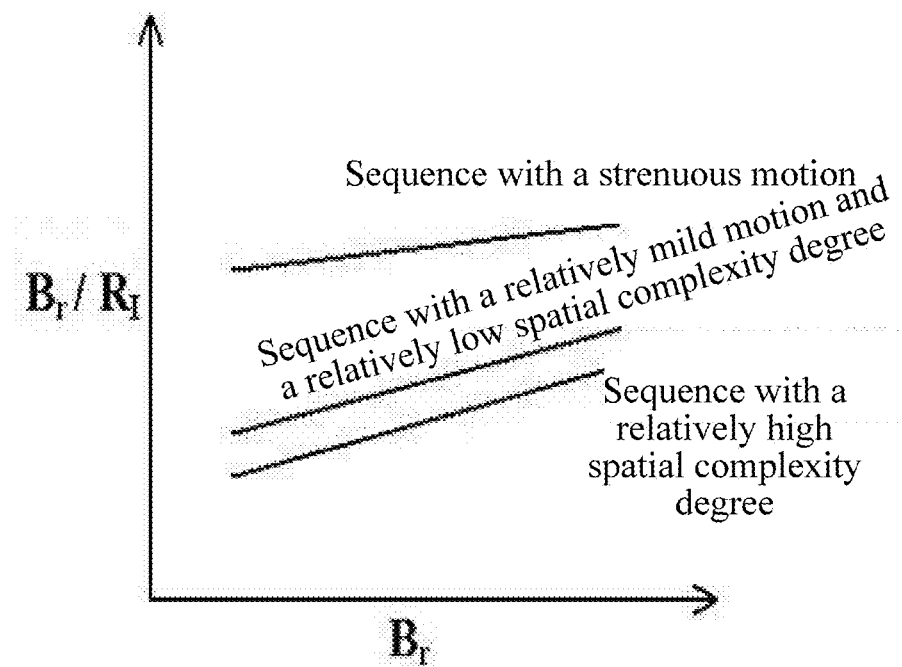
FIG. 7 is a schematic diagram showing a relationship of ratios R, a ratio of the encoding rate Br to the number of I-frame encoding bits.

Referring to FIG. 7, generally, a value of R is increasingly great in a sequence with an increasingly strenuous motion; a value of R is increasingly small in a sequence with an increasingly high spatial complexity degree, and a value of R in a sequence with a relatively mild motion and a low spatial complexity degree is between the values in the foregoing two conditions and is close to a value of R in a sequence with a relatively high spatial complexity degree. Moreover, a value of R and a bit rate present an approximately linear rule relationship.

According to the foregoing rule, a threshold α is set, and an absolute value of a difference between R and α is used to represent video content complexity, where the threshold α and the bit rate Br present a linear relationship, and its value is close to a value of R in a sequence with a relatively mild motion and a low spatial complexity degree.

$$\lambda = |R - \alpha|$$

$$\alpha = a_6 \cdot Br + b_6 \quad \text{Formula (12)}$$

Specifically, when a frame rate Fr and a GOP length have different combinations, it may also be considered to add the frame rate and the GOP length to calculate λ together.

In a second method, after a statistical analysis experiment on a large amount of bit stream data, it is found that a ratio T of the average number of P-frame encoding bits $R_P$ to the number of I-frame encoding bits $R_I$ (or the average number of I-frame encoding bits of multiple video segments) in a video segment may reflect a video content feature to a certain degree.

$$T = R_P / R_I \quad \text{Formula (13)}$$

Figure 8:
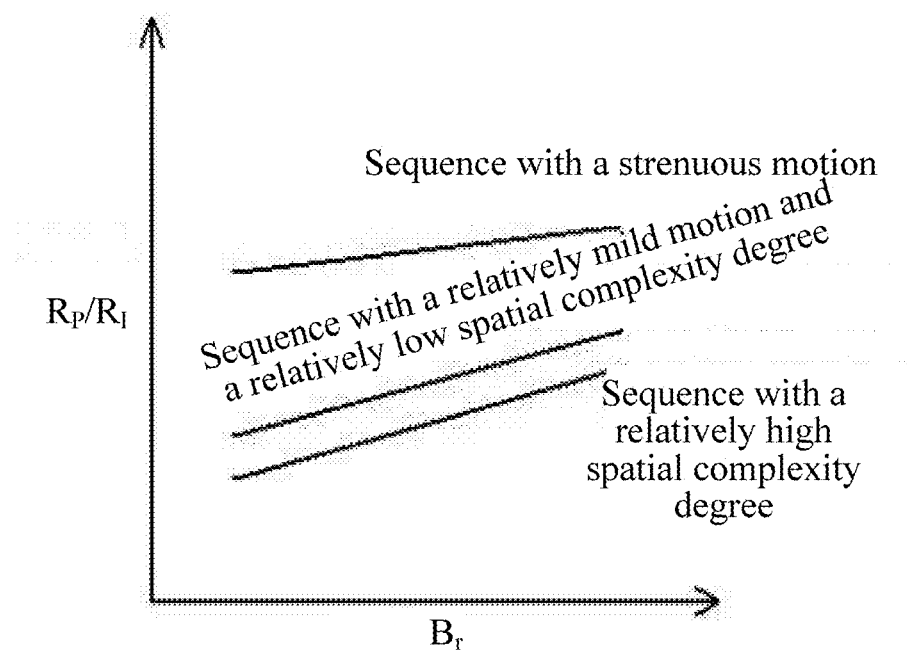
FIG. 8 is a schematic diagram showing a relationship of ratios T, a ratio of the average number of encoding bits of P-frame to the number of encoding bits of I-frame in a video segment.

Referring to FIG. 8, generally, a value of T is increasingly great in a sequence with an increasingly strenuous motion; a value of T is increasingly small in a sequence with an increasingly high spatial complexity degree, and the value of T in a sequence with a relatively mild motion and a low spatial complexity degree is between the values in the foregoing two conditions and is close to a value of T in a sequence with a relatively high spatial complexity degree. Moreover, a value of T and a bit rate present an approximately linear rule relationship.

According to the foregoing rule, a threshold β is set, and an absolute value of a difference between T and β is used to represent video content complexity, where the threshold β and the bit rate Br present a linear relationship, and its value is close to a value of T in a sequence with a relatively mild motion and a low spatial complexity degree.

$$\lambda = |T - \beta|$$

$$\beta = a_7 \cdot Br + b_7 \quad \text{Formula (14)}$$

Specifically, when a frame rate Fr and a GOP length have different combinations, it may also be considered to add the frame rate and the GOP length to calculate λ together.

Particularly, in some application scenarios, if the video content complexity (λ) can be obtained by means of channel information transmission, a calculation process may be omitted, and compression distortion quality is accurately calculated by directly using the model formula described in this embodiment.

In some application scenarios, for example, when a computational capability of a terminal device (a network device or a test device) is too low, an operating result of each formula involved in this embodiment may be replaced through table look-up.

Figure 9:
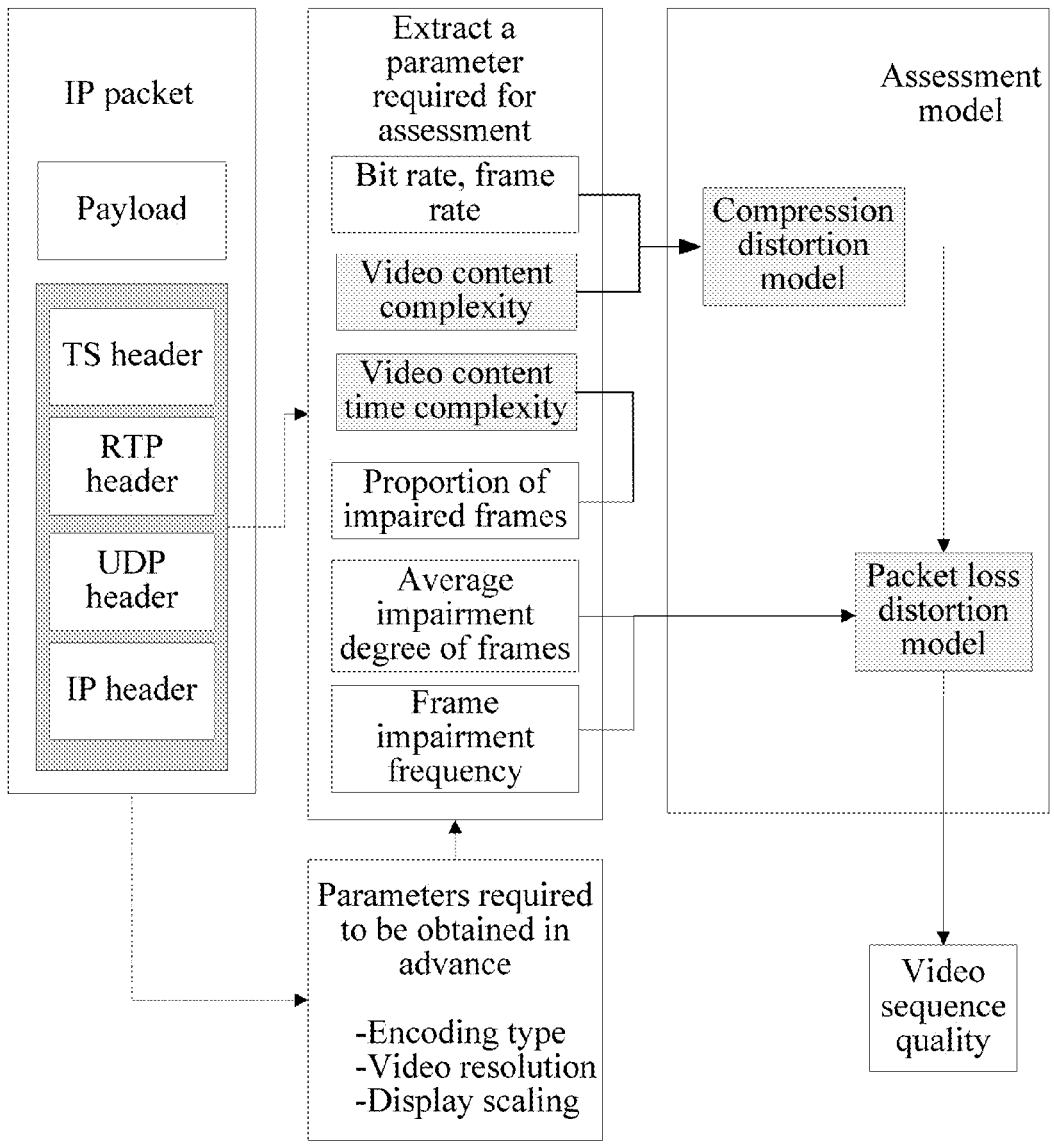
FIG. 9 is a schematic diagram of another calculation model of a video data quality assessment method according to the present invention.

Referring to FIG. 9, when video content category information cannot be obtained in advance or a category is not precise enough, in order to obtain more accurate packet loss distortion quality, video content temporal complexity (which is represented by σ; the video content temporal complexity provided in this embodiment is used to represent a motion intensity of a video sequence; the more strenuous a motion is, the higher the video content temporal complexity is, and the lower (on the contrary) precisely representing different video content may be calculated first, and then calculation is performed with reference to the packet loss distortion model in the embodiment corresponding to FIG. 3.

Figure 10:
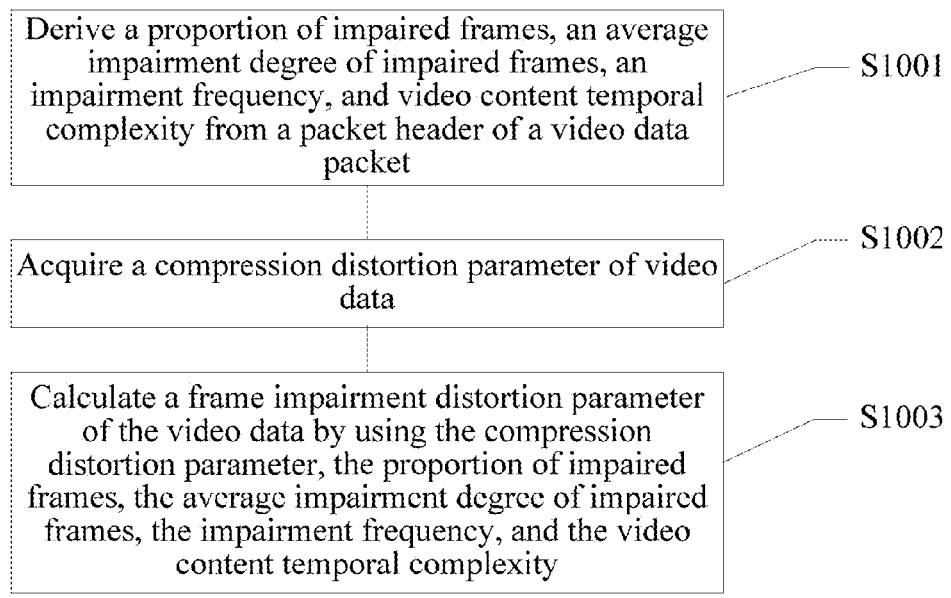
FIG. 10 is a schematic flow chart of another embodiment of a video data quality assessment method according to the present invention.

Referring to FIG. 10, another embodiment of a video data quality assessment method in the present invention is shown, which includes:

S1001: Derive a proportion of impaired frames, an average impairment degree of impaired frames, an impairment frequency, and video content temporal complexity from a packet header of a video data packet.

In the video data quality assessment method, distortion caused by a frame impairment is calculated. First, a frame boundary needs to be obtained according to a Marker bit of an RTP data packet or a payload_unit_start_indicator bit of a TS packet, an impairment condition of each video frame is obtained according to information such as a timestamp and a sequence number of the data packet, and at the same time, a frame type (an I/IDR frame, a P frame, a B frame, and a non-I/IDR scenario switching frame) is inferred according to a frame size (an encoded data amount), and the following information is obtained through collecting statistics:

(1) the proportion (x) of impaired frames: a proportion of the number of impaired frames (including a frame with a packet loss and a frame affected due to bit error propagation) to the total number of frames in a sequence that needs to be graded;

(2) the average impairment degree (y) of impaired frames: an average impairment proportion of the impaired frames; and (3) the impairment frequency (FLF) in a period of time: the impairment frequency is also referred to as a frequency of a packet loss event, that is, the number of packet loss events in a fixed duration; where distortion of a packet loss event ends at I/IDR or a scenario switching frame; when a distortion ending boundary cannot be known in some application scenarios, an adjacent impaired frame is counted into one impairment, and for the impairment frequency, statistics about the number of impairments in a period of time may be directly collected.

The video content temporal complexity σ may be obtained through calculation by using the following two methods:

$$\sigma = c_4 \cdot (Br/R_I) + c_5$$

or $$\sigma = c_4 \cdot (R_P/R_I) + c_5 \quad \text{Formula (15),}$$

where $c_4$, $c_5$ are constants.

Specifically, when a frame rate Fr and a GOP length have different combinations, it may also be considered to add the frame rate and the GOP length to calculate σ together.

S1002: Acquire a compression distortion parameter of video data.

The compression distortion parameter of the video data indicates that video basic quality of video encoding compression distortion is taken into consideration, and the parameter may be obtained through multiple methods, for example, a calculation method in the prior art may be used, and the method described below in this embodiment may also be used.

S1003: Calculate a frame impairment distortion parameter of the video data by using the compression distortion parameter, the proportion of impaired frames, the average impairment degree of impaired frames, the impairment frequency, and the video content temporal complexity, where the frame impairment distortion parameter is between 0 and a difference between the compression distortion parameter and a minimum quality value, and the video frame impairment distortion parameter decreases to the minimum quality value as any one of the proportion of impaired frames, the average impairment degree of impaired frames, and the impairment frequency increases, and increases as the video content temporal complexity increases. Quality of a video sequence is obtained by subtracting the frame impairment distortion parameter from the compression distortion parameter of the video data.

$$Q_{sequence} = Q_{encoding} - Q_{framedistortion} \quad \text{Formula (16)}$$

In an embodiment, the frame impairment distortion parameter of the video data is calculated by using the following formula:

$$Q_{framedistortion} = (Q_{encoding} - a_1) \times f(x, y, FLF, \sigma) \quad \text{Formula (17).}$$

In Formula (17), $a_1$ represents minimum quality of the video sequence (for example, if the grading is a five-grade rating system, the minimum quality may be 1); $f(x, y, FLF, \sigma)$ represents a function formed by the proportion of impaired frames, the average impairment degree of impaired frames, the impairment frequency and video content complexity, where the function satisfies a relationship of $0 \leq f(x, y, FLF, \sigma) \leq 1$, and its value increases and is infinitely close to 1 as any variable of the proportion of impaired frames, the average impairment degree of impaired frames, and the impairment frequency increases, and increases as the video content complexity increases. That is, when x, y or FLF is small, distortion is invisible; the lower the video content complexity is, the less obvious the distortion is; while when x, y or FLF increases to a certain degree, a mark directly falls to the lowest. The higher the video content temporal complexity is, the more easily the distortion can be found.

In an embodiment, $f(x, y, FLF, \sigma)$ is calculated by using the following formula:

$$f(x, y, FLF, \sigma) = \frac{\left(\frac{x \cdot y}{\text{func1}(\sigma)}\right)^{b_4} \left(\frac{FLF}{\text{func2}(\sigma)}\right)^{b_5}}{1 + \left(\frac{x \cdot y}{\text{func1}(\sigma)}\right)^{b_4} \left(\frac{FLF}{\text{func2}(\sigma)}\right)^{b_5}}. \quad \text{Formula (18)}$$

In Formula (18), $a_1$, $b_4$, $b_5$ are constants, and have different values under different encoding types, video resolutions (and display scaling), and video content categories. func1($\sigma$) and func2($\sigma$) are functions relevant to the video content temporal complexity, and their values decrease as a value of $\sigma$ increases, where a specific presentation form may be a linear form, a nonlinear form, or a combination of a linear form and a nonlinear form. A specific physical meaning is described as follows:

$b_4$: represents a sensitivity degree of a subjective sense of the human eyes toward the video of this type to the video content impairment proportion; and $b_5$: represents a sensitivity degree of a subjective sense of the human eyes toward the video of this type to the impairment frequency.

Particularly, in some application scenarios, if the video content temporal complexity ($\sigma$) can be obtained by means of channel information transmission, a calculation process may be omitted, and packet loss distortion quality is accurately calculated by directly using the model formula described in this embodiment.

In some application scenarios, for example, when a computational capability of a terminal device (a network device or a test device) is too low, an operating result of each formula involved in this embodiment may be replaced through table look-up.

In different embodiments, $f(x, y, FLF, \sigma)$ may be calculated by using the following formulas separately:

$$f(x,y,FLF,\sigma) = (a_4 \cdot (x \cdot y)^2 + b_4 \cdot x \cdot y + c_4) \cdot (a_5 \cdot FLF^2 + b_5 \cdot FLF + c_5) \cdot \text{func}(\sigma) \quad \text{Formula (19),}$$

where $a_4$, $b_4$, $c_4$, $a_5$, $b_5$, $c_5$ are constants, and have different values under different encoding types, video resolutions (and display scaling), and video content categories; func($\sigma$) is a function relevant to the video content temporal complexity, and its value increases as a value of $\sigma$ increases; and a specific presentation form may be a linear form, a nonlinear form, or a combination of a linear form and a nonlinear form;

$$f(x,y,FLF,\sigma) = (a_4 \cdot x^2 + b_4 \cdot x + c_4) \cdot (a_5 \cdot y^2 + b_5 \cdot y + c_5) \cdot (a_6 \cdot FLF^2 + b_6 \cdot FLF + c_6) \cdot \text{func}(\sigma) \quad \text{Formula (20),}$$

where $a_4$, $b_4$, $c_4$, $a_5$, $b_5$, $c_5$, $a_6$, $b_6$, $c_6$ are constants, and have different values under different encoding types, video resolutions (and display scaling), and video content categories; func($\sigma$) is a function relevant to the video content temporal complexity, and its value increases as a value of $\sigma$ increases; and a specific presentation form may be a linear form, a nonlinear form, or a combination of a linear form and a nonlinear form;

$$f(x, y, FLF, \sigma) = \left(\frac{x \cdot y}{\text{func1}(\sigma)}\right)^{b_4} \cdot \left(\frac{FLF}{\text{func2}(\sigma)}\right)^{b_5} \quad \text{Formula (21)}$$

or $$f(x, y, FLF, \sigma) = (\text{func1}(\sigma) \cdot e^{(b_4 \cdot x \cdot y)}) \cdot (\text{func2}(\sigma) \cdot e^{(b_5 \cdot FLF)}),$$

where $b_4$, $b_5$ are constants, and have different values under different encoding types, video resolutions (and display scaling), and video content categories; func1($\sigma$) and func2($\sigma$) are functions relevant to the video content temporal complexity, and their values decrease as a value of $\sigma$ increases; and a specific presentation form may be a linear form, a nonlinear form, or a combination of a linear form and a nonlinear form; and $$f(x, y, FLF, \sigma) = \left(\frac{x}{\text{func1}(\sigma)}\right)^{b_4} \cdot \left(\frac{y}{\text{func2}(\sigma)}\right)^{b_5} \cdot \left(\frac{FLF}{\text{func3}(\sigma)}\right)^{b_6} \quad \text{Formula (22)}$$

or $$f(x, y, FLF, \sigma) = (\text{func1}(\sigma) \cdot e^{(b_4 \cdot x)}) \cdot (\text{func2}(\sigma) \cdot e^{(b_5 \cdot y)}) \cdot (\text{func3}(\sigma) \cdot e^{(b_6 \cdot FLF)}),$$

where $b_4$, $b_5$, $b_6$ are constants, and have different values under different encoding types, video resolutions (and display scaling), and video content categories; func1($\sigma$), func2($\sigma$) and func3($\sigma$) are functions relevant to the video content temporal complexity, and their values decrease as a value of $\sigma$ increases; and a specific presentation form may be a linear form, a nonlinear form, or a combination of a linear form and a nonlinear form.

Further, in some application scenarios, for a video stream encoded through the H.264 protocol, if information related to an NAL header can be parsed, complexity is not increased too much, and information about whether the frame is a reference frame can be exactly obtained; then, the frame type and a packet loss distribution condition may be inferred more accurately with reference to the frame size.

A video quality assessment model provided in the present solution does not need to parse a video bit stream payload, but assesses the video stream only by using packet header information of a data packet, so that complexity is greatly reduced, and assessment can be implemented in real time. Meanwhile, a feature which is of a video and is different from a feature of a common transmitted data packet is further taken into consideration, so a result is more accurate than that obtained by directly using a packet loss rate of the data packet during a packet loss influence calculation.

Figure 11:
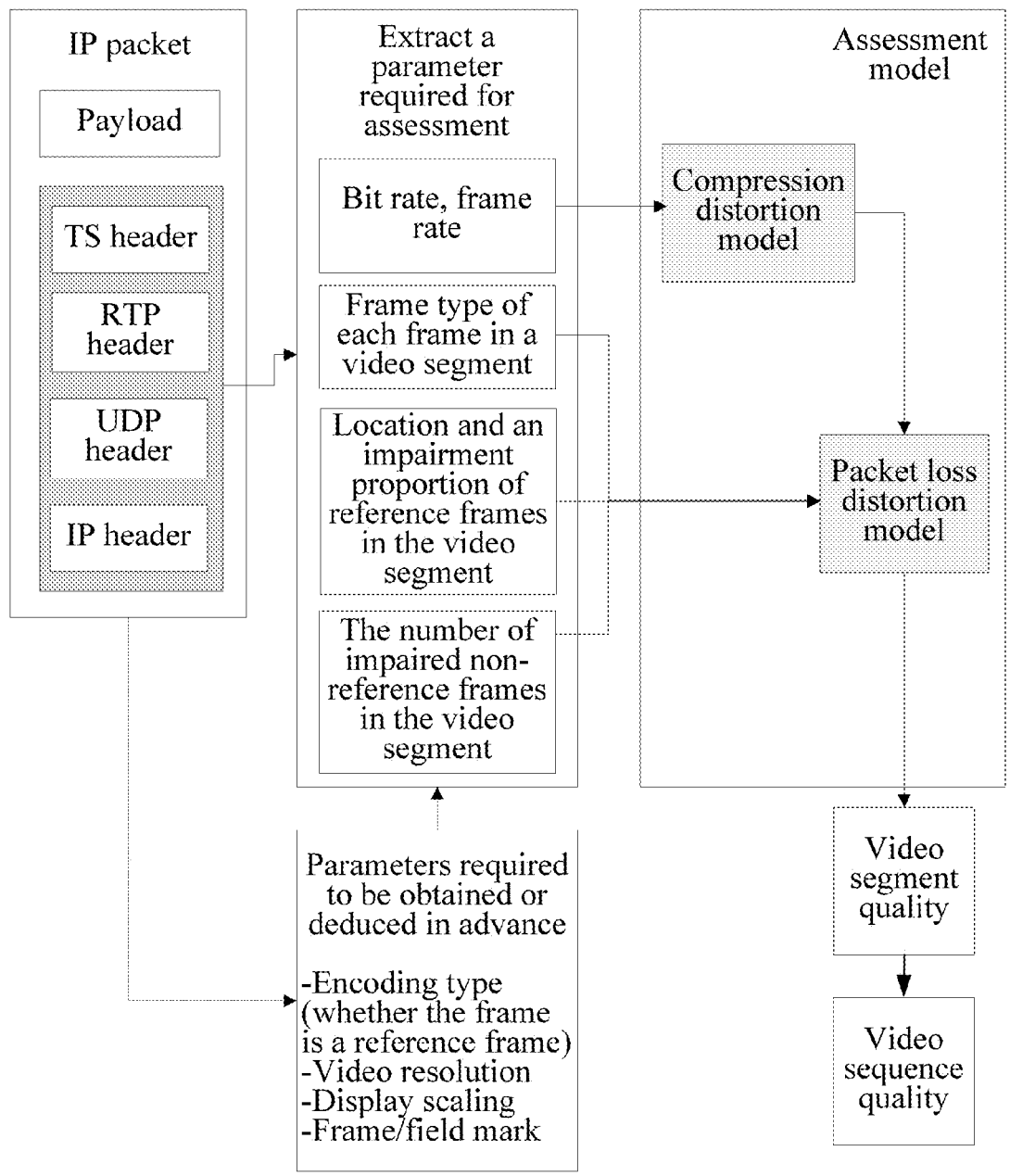
FIG. 11 is a schematic diagram of another calculation model of a video data quality assessment method according to the present invention.

Referring to FIG. 11, by using packet header information of a data packet and with reference to pre-obtained parameter information, a direct input parameter required for assessment is deduced together, a compression distortion model and a packet loss distortion model are calculated, and final video sequence quality is obtained. An input parameter of a model is specific impairment information of a short video segment (takes a bit error ending frame as a boundary, and is generally a GOP) rather than a video sequence or statistical information in a long period of time in the foregoing embodiment. First, a bit error ending boundary (for example, an I/IDR frame or a scenario switching frame) is detected to divide a video segment, and then quality assessment is performed on the video segment, so as to obtain a video sequence or quality of a video stream in a long period of time.

Figure 12:
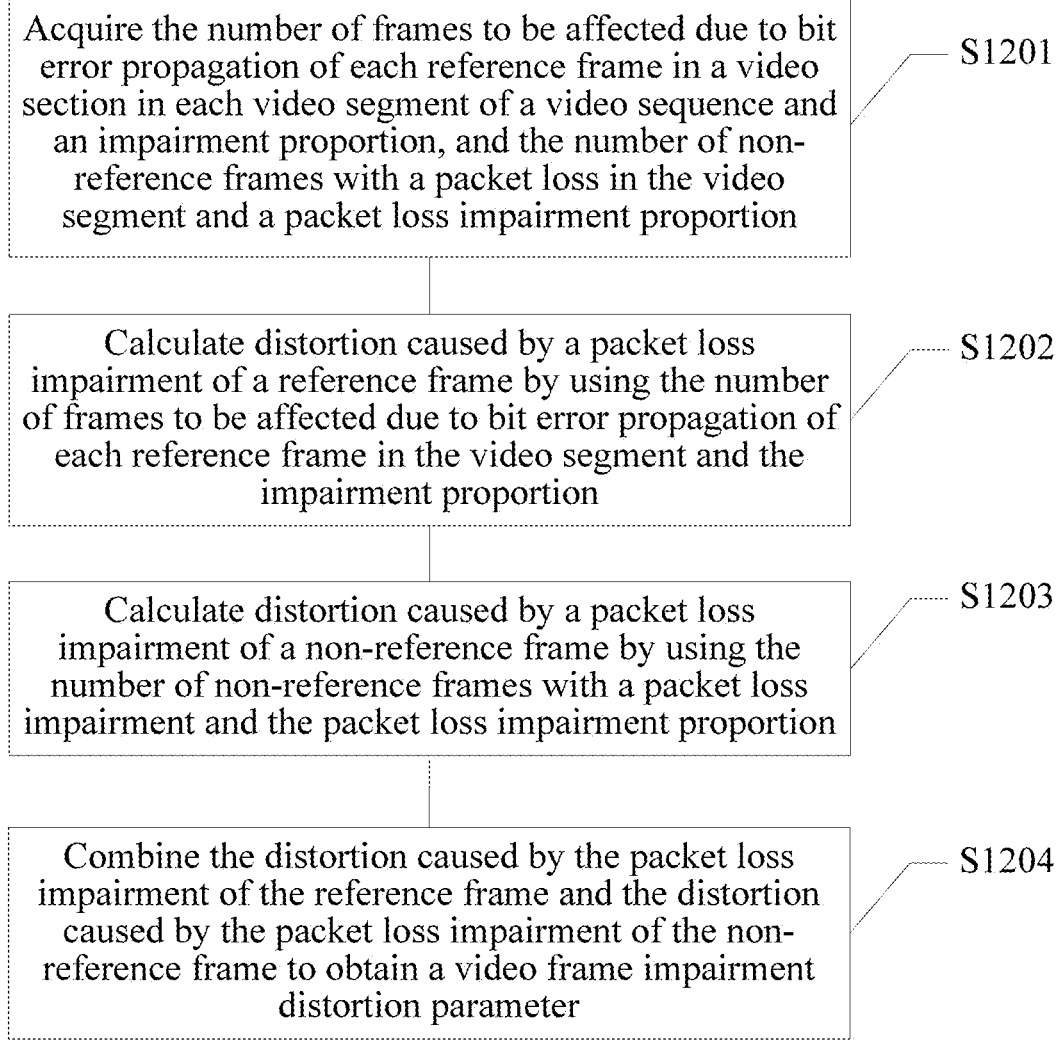
FIG. 12 is a schematic flow chart of another embodiment of a video data quality assessment method according to the present invention.

Referring to FIG. 12, another embodiment of a video data quality assessment method in the present invention is shown, which includes:

S1201: Acquire the number of frames to be affected due to bit error propagation of each reference frame in a video segment in each video segment of a video sequence and an impairment proportion, and the number of non-reference frames with a packet loss in the video segment and a packet loss impairment proportion.

A packet loss distortion model actually calculates distortion caused by a frame impairment to a video segment. A video segment is a short section of a whole video sequence, and may be a section with a fixed length or a variable length, and is generally a GOP. First, a frame boundary needs to be obtained according to a Marker bit of an RTP data packet or a payload_unit_start_indicator bit of a TS packet, a packet loss impairment condition of each video frame is obtained according to information such as a timestamp and a sequence number of a data packet, and at the same time, a frame type (an I/IDR frame, a P frame, a B frame, and a non-I/IDR scenario switching frame) and/or whether these frames are reference frames are inferred according to a frame size (an encoded data amount), to obtain a video segment boundary. The following information is obtained through collecting statistics:

(1) a location of each reference frame in the video segment (the number of frames to be affected due to bit error propagation) and the impairment proportion; and (2) the number of non-reference frames with a packet loss in the video segment and the packet loss impairment proportion.

S1202: Calculate distortion caused by a packet loss impairment of a reference frame by using the number of frames to be affected due to bit error propagation of each reference frame in the video segment and the impairment proportion; where the distortion caused by the packet loss impairment of the reference frame increases as any one of the number of frames to be affected due to bit error propagation and the impairment proportion increases.

When a reference frame in a video segment has a packet loss, an influence on the video segment is mainly determined by a basic mark ($Q_{encoding}$) calculated by a compression distortion model, that is, a compression distortion parameter, a reciprocal position of the reference frame in the video segment (the number of frames propagated by a bit error), and the packet loss impairment proportion of the reference frame. A specific model formula is as follows:

$$D_{ref\_i} = (Q_{encoding_i} - a_1) \times \text{func1}(x_1) \cdot \text{func2}(x_2) \qquad \text{Formula (23)}.$$

In Formula (23), $Q_{encoding_i}$ is a compression distortion parameter of an $i^{th}$ video segment, $a_1$ is a constant and represents a lowest mark of a video, $x_1$ represents the number of frames behind this reference frame and before an end of the video segment, that is, the number of frames propagated by a bit error, $x_2$ represents the packet loss impairment proportion of this reference frame, $\text{func1}(x_1)$ represents a distortion influence factor caused on the video segment if a whole frame of this reference frame is lost or a frame header is lost, and $\text{func2}(x_2)$ represents different subjective distortion degree influence factors caused by different packet loss impairment proportions of the frame.

$\text{func1}(x_1)$ needs to increase as $x_1$ increases, its model may be nonlinear or linear, and the following formula is taken as an example:

$$\text{func1}(x_1) = 1 - a_{11} \cdot x_1^{b_{11}}$$

or $\text{func1}(x_1) = a_{11} \cdot x_1 + b_{11}$ or $\text{func1}(x_1) = a_{11} \cdot x_1^2 + b_{11} \cdot x_1 + c_{11}$ \qquad Formula (24).

In Formula (24), $a_{11}$, $b_{11}$ are constants. Certainly, $\text{func1}(x_1)$ may also be a combination of another linear form and nonlinear form that is different from the foregoing formula.

$\text{func2}(x_2)$ needs to increase as $x_2$ increases, its model may be nonlinear or linear, and the following formula is taken as an example:

$$\text{func2}(x_2) = a_{12} + b_{12} \cdot \left(1 - \frac{1}{1 + \left(\frac{x_2}{c_{12}}\right)^{d_{12}}}\right) \qquad \text{Formula (25)}$$

or $$\text{func2}(x_2) = a_{12} \cdot x_2 + b_{12}$$

or $$\text{func2}(x_2) = a_{12} \cdot x_2^2 + b_{12} \cdot x_2 + c_{12}.$$

In Formula (25), $a_{12}$, $b_{12}$, $c_{12}$, $d_{12}$ are constants. Certainly, $\text{func2}(x_2)$ may also be a combination of another linear form and nonlinear form that is different from the foregoing formula.

When multiple reference frames in the video segment have a packet loss, influence elements on the video segment mainly include: a subjective distortion degree ($D_{ref\_i}$) of the packet loss impairment of each reference frame on the video segment, and the number (N) of reference frames with a packet loss impairment. A specific calculation formula is as follows:

$$D_{ref} = \text{func}(D_{ref\_i}, N) \qquad \text{Formula (26)}.$$

When a distortion value $D_{ref\_i}$ calculated for each reference frame with a packet loss impairment becomes increasingly great, as the number N of frames with the packet loss impairment increases, a value of $D_{ref}$ calculated according to the foregoing formula also becomes increasingly great. A specific model may be linear or nonlinear, and certainly, may also be a combination of a linear model and a nonlinear model.

S1203: Calculate distortion caused by a packet loss impairment of a non-reference frame by using the number of non-reference frames with a packet loss impairment and the packet loss impairment proportion.

When one or more non-reference frames in the video segment have a packet loss, influence elements on the video segment mainly include: the number (M) of non-reference frames with a packet loss impairment, and a packet loss impairment degree ($B_{dist\_percent\_i}$) of the non-reference frames. A specific model formula is as follows:

$$D_{non\_ref} = \text{func}(B_{dist\_percent\_i}, M) \quad \text{Formula (27)}.$$

In the foregoing formula, $B_{dist\_percent\_i}$ represents a distance between an impaired location and an area that human eyes focus on, M represents the number of non-reference frames with a packet loss; the larger the number of non-reference frames with a packet loss impairment is, the closer the impaired location to the area that human eyes focus on is, and the greater a distortion value is. A specific model may be linear or nonlinear, and certainly, may also be a combination of a linear model and a nonlinear model.

S1204: Combine the distortion caused by the packet loss impairment of the reference frame and the distortion caused by the packet loss impairment of the non-reference frame to obtain distortion ($D_{segment}$) caused by the packet loss (frame impairment), where this distortion is a video frame impairment distortion parameter ($Q_{framedistortion}$), and quality $Q_{segment}$ of the video segment is obtained by subtracting the video frame impairment distortion parameter from the compression distortion parameter ($Q_{encoding}$).

$$Q_{framedistortion} = D_{segment} \quad \text{Formula (28)}$$

$$Q_{segment} = Q_{encoding} - D_{segment} \quad \text{Formula (29)}$$

The video frame impairment distortion parameter is obtained through calculation by using the distortion ($D_{ref}$) caused by the packet loss impairment of the reference frame and the distortion ($D_{non\_ref}$) caused by the packet loss impairment of the non-reference frame:

$$D_{segment} = \text{func}(D_{ref}, D_{non\_ref}) \quad \text{Formula (30)}.$$

The distortion caused by the packet loss impairment of the reference frame has a larger influence on the video segment, while the distortion caused by the packet loss impairment of the non-reference frame has a smaller influence on the video segment. A specific form of the foregoing formula may be obtained according to different application scenarios or an encoding manner through weighted average or nonlinear combination.

Particularly, when a video content category cannot be known, the parameter values described in this embodiment may use statistical default values (for example, an average of parameter values of different kinds or a parameter value of a specific kind).

In some application scenarios, for example, when a computational capability of a terminal device (a network device or a test device) is too low, an operating result of each formula involved in this embodiment may be replaced through table look-up.

In the foregoing embodiment, the compression distortion parameter of the video data indicates that video basic quality of video encoding compression distortion is taken into consideration, and the parameter may be obtained through multiple methods, for example, a calculation method in the prior art may be used, and the method mentioned in the foregoing embodiment may also be used. For example, the method corresponding to FIG. 4 may be used, and the method corresponding to FIG. 6 may also be used.

Figure 13:
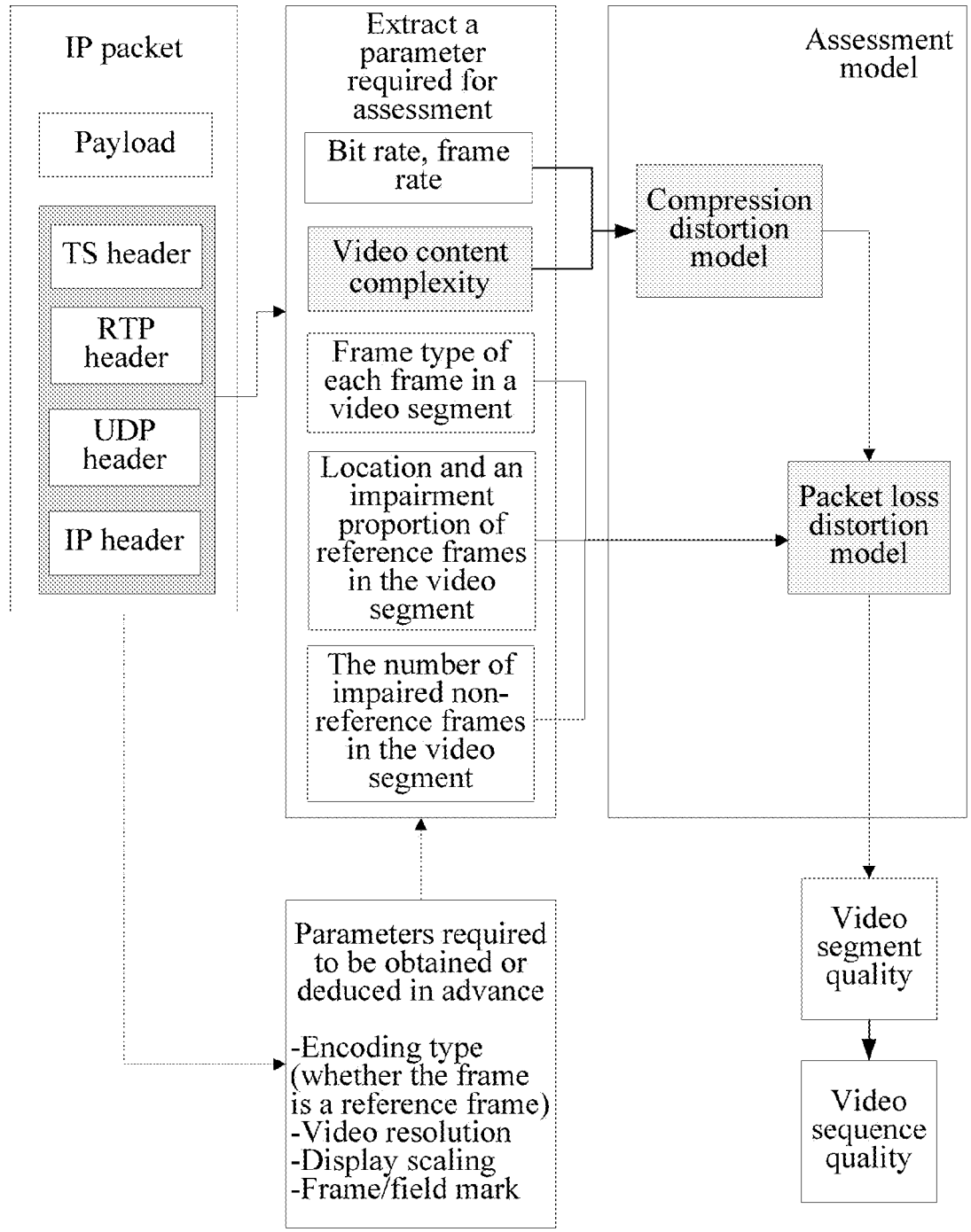
FIG. 13 is a schematic diagram of another calculation model of a video data quality assessment method according to the present invention.
Figure 14:
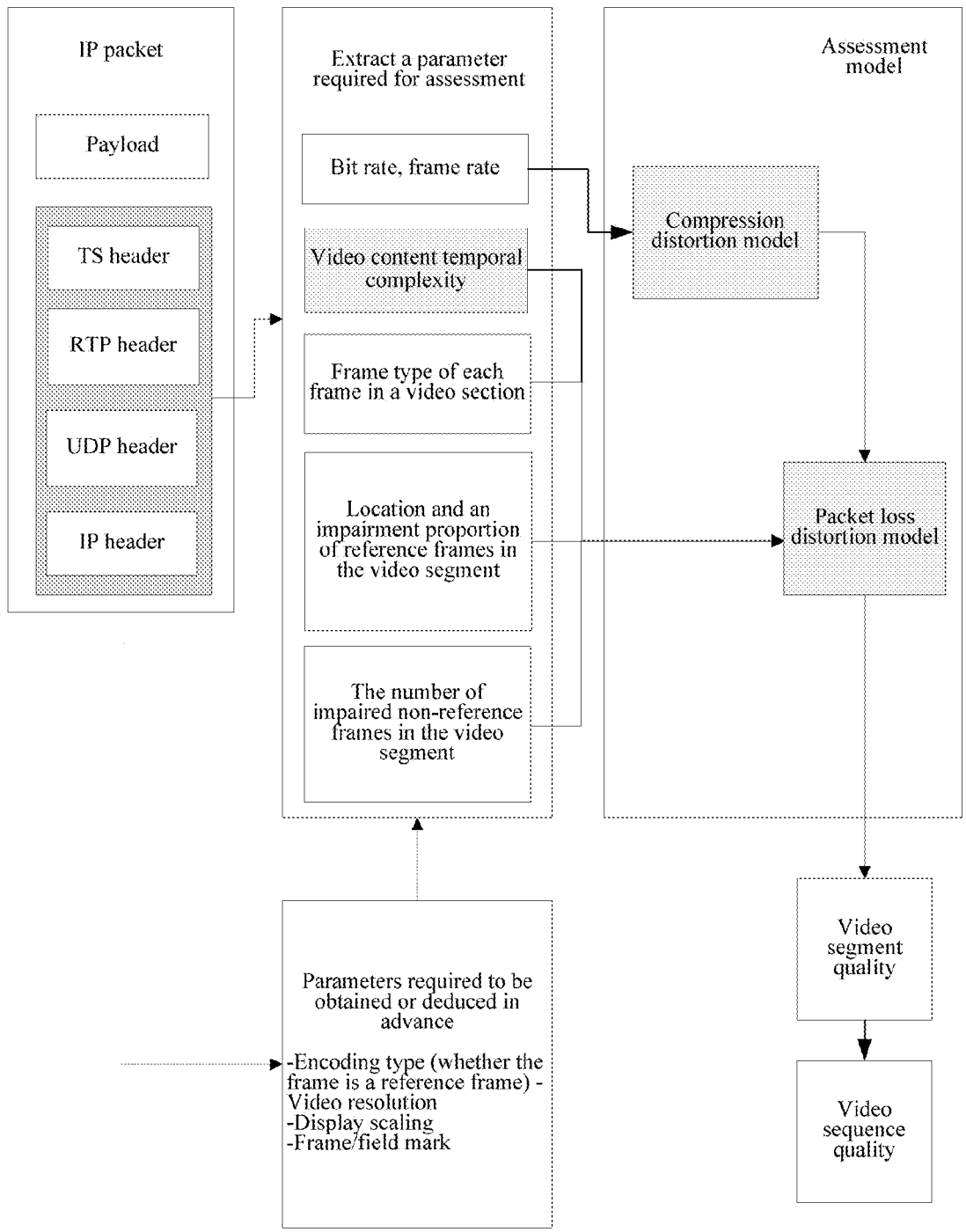
FIG. 14 is a schematic diagram of another calculation model of a video data quality assessment method according to the present invention.

Referring to FIG. 13 and FIG. 14, when video content category information cannot be obtained in advance or a category is not precise enough, in order to obtain more accurate packet loss distortion quality, video content temporal complexity precisely representing different video content may be calculated first (a calculation method is the same as that described in the embodiment corresponding to FIG. 10), and then, calculation is performed with reference to the packet loss distortion model in the embodiment corresponding to FIG. 12. At the same time, a compression distortion model may be calculated by using the model mentioned in the first embodiment, and a specific parameter value may use a statistical default value.

Figure 15:
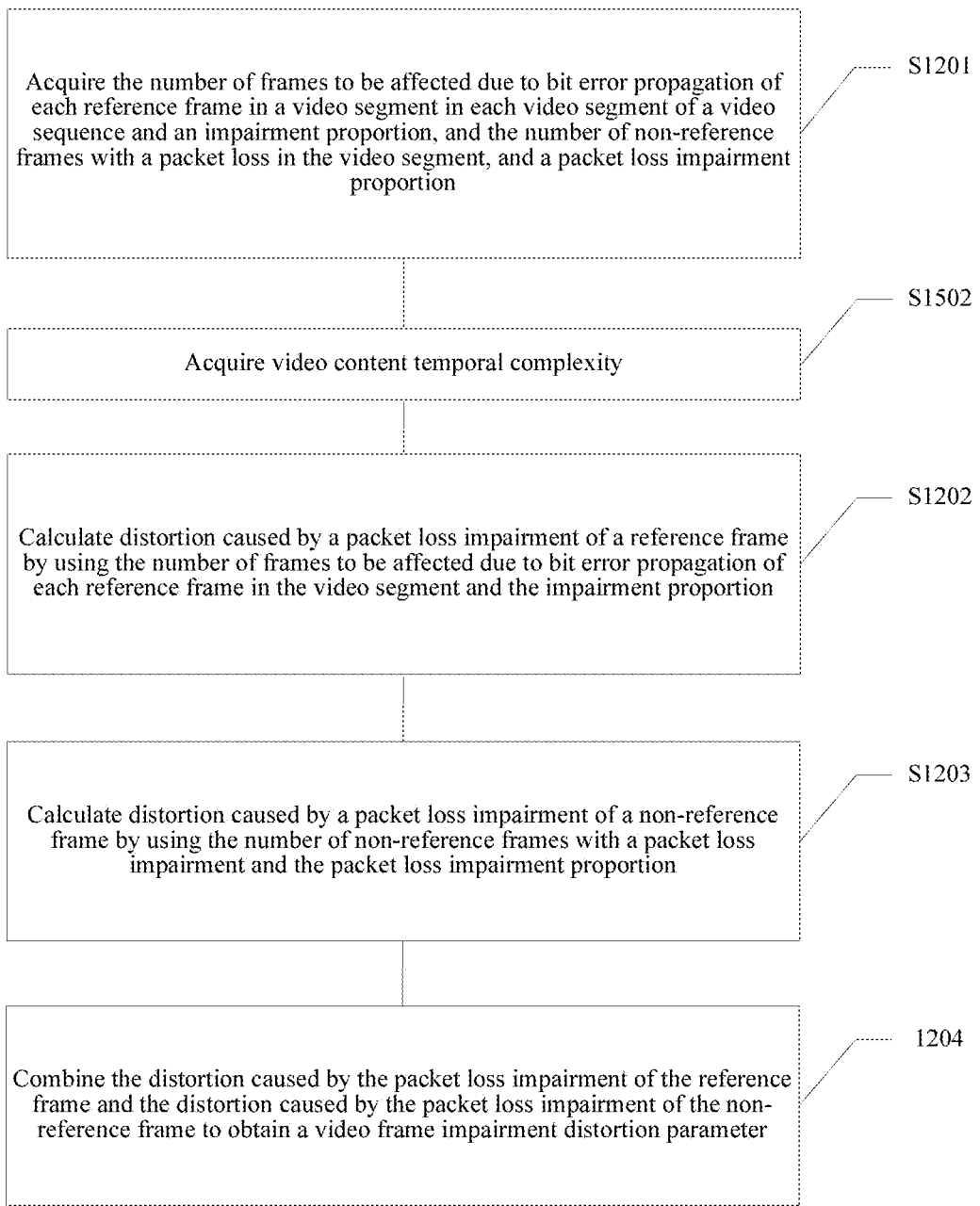
FIG. 15 is a schematic flow chart of another embodiment of a video data quality assessment method according to the present invention.

Referring to FIG. 15, an embodiment of a method for acquiring a video quality parameter in the present invention is shown, which further includes:

S1502: Acquiring video content temporal complexity.

A video frame impairment distortion parameter increases as the video content temporal complexity increases. An influence of the video content temporal complexity is added into distortion caused by a packet loss impairment of a reference frame and a non-reference frame; the distortion caused by the packet loss impairment of the reference frame increases as the video content temporal complexity increases; and the distortion caused by the packet loss impairment of the non-reference frame also increases as the video content temporal complexity increases.

An influence of the video content temporal complexity $\sigma$ on the distortion caused by the packet loss impairment of the reference frame is expressed as follows:

$$D_{ref\_i} = (Q_{encoding_i} - a_1) \times \text{func1}(x_1, \sigma) \cdot \text{func2}(x_2) \quad \text{Formula (31)}.$$

In Formula (31), $a_1$ is a constant and represents a lowest mark of a video, and $\text{func1}(x_1, \sigma)$ is a function relevant to the number of frames propagated by a bit error and the video content temporal complexity, whose specific form may be as follows:

$$\text{func1}(x_1, \sigma) = 1 - a_{11} \cdot x_1^{func(\sigma)}$$

or $\text{func1}(x_1, \sigma) = \text{func}(\sigma) \cdot x_1 + b_{11} \quad \text{Formula (32)}.$ In Formula (32), $a_{11}$, $b_{11}$ are constants, $\text{func}(\sigma)$ may be a linear model or a nonlinear model, and may also be a combination of a linear model and a nonlinear model, as long as it can be ensured that $\text{func1}(x_1, \sigma)$ increases as $\sigma$ increases. $\text{func1}(x_1, \sigma)$ may also have other forms.

An influence of the video content temporal complexity $\sigma$ on the distortion caused by the packet loss impairment of the non-reference frame is expressed as follows:

$$D_{non\_ref} = \text{func}(B_{dist\_percent_i}, M, \sigma). \quad \text{Formula (33)}$$

In the foregoing formula, the larger the number of non-reference frames with a packet loss is, the closer an impaired location to an area that human eyes focus on is, the greater the video content temporal complexity $\sigma$ is, and the greater a distortion value is. A specific model may be linear or nonlinear, and may also be a combination of a linear model and a nonlinear model.

Particularly, in some application scenarios, if the video content temporal complexity (σ) can be obtained by means of channel information transmission, packet loss distortion quality may also be accurately calculated by using the model formula in this embodiment.

In some application scenarios, for example, when a computational capability of a terminal device (a network device or a test device) is too low, an operating result of each formula involved in this embodiment may be replaced through table look-up.

The packet loss distortion parameter is obtained through the method corresponding to FIG. 4.

Figure 16:
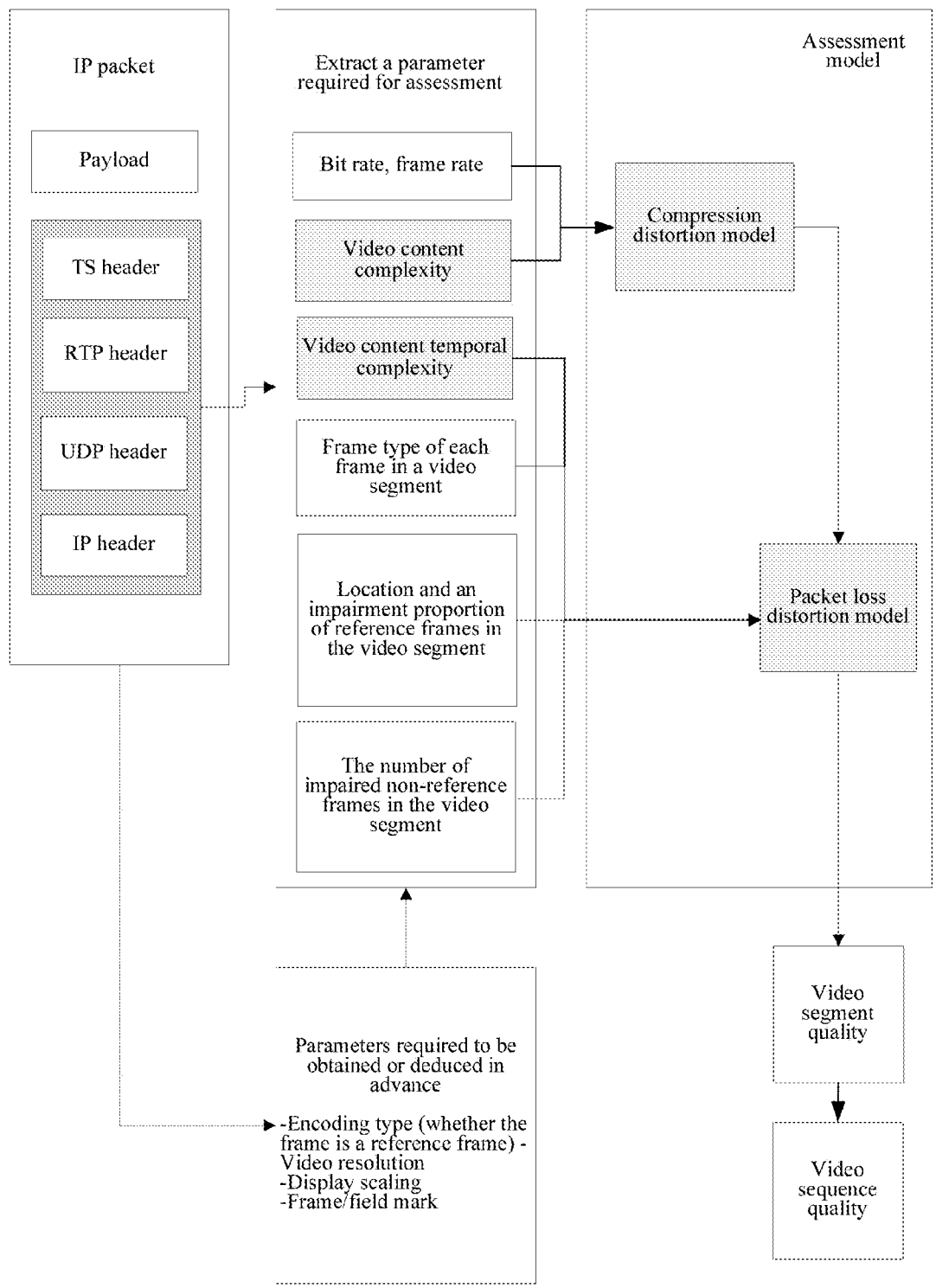
FIG. 16 is a schematic diagram of another calculation model of a video data quality assessment method according to the present invention.

Referring to FIG. 16, when video sequence quality is calculated, a compression distortion model calculated in consideration of video content complexity and the packet loss distortion model calculated in consideration of video content temporal complexity are combined together.

Particularly, in some application scenarios, if the video content complexity (λ) and the video content temporal complexity (σ) can be obtained by means of channel information transmission, the compression distortion quality and the packet loss distortion quality may also be accurately calculated with the model formula described in this embodiment.

In the foregoing embodiment, when the video data quality is calculated, by taking influences caused a frame impairment degree and bit error expansion and an influence of the packet loss impairment on different video content into consideration, an assessment result is more accurate.

Figure 17:
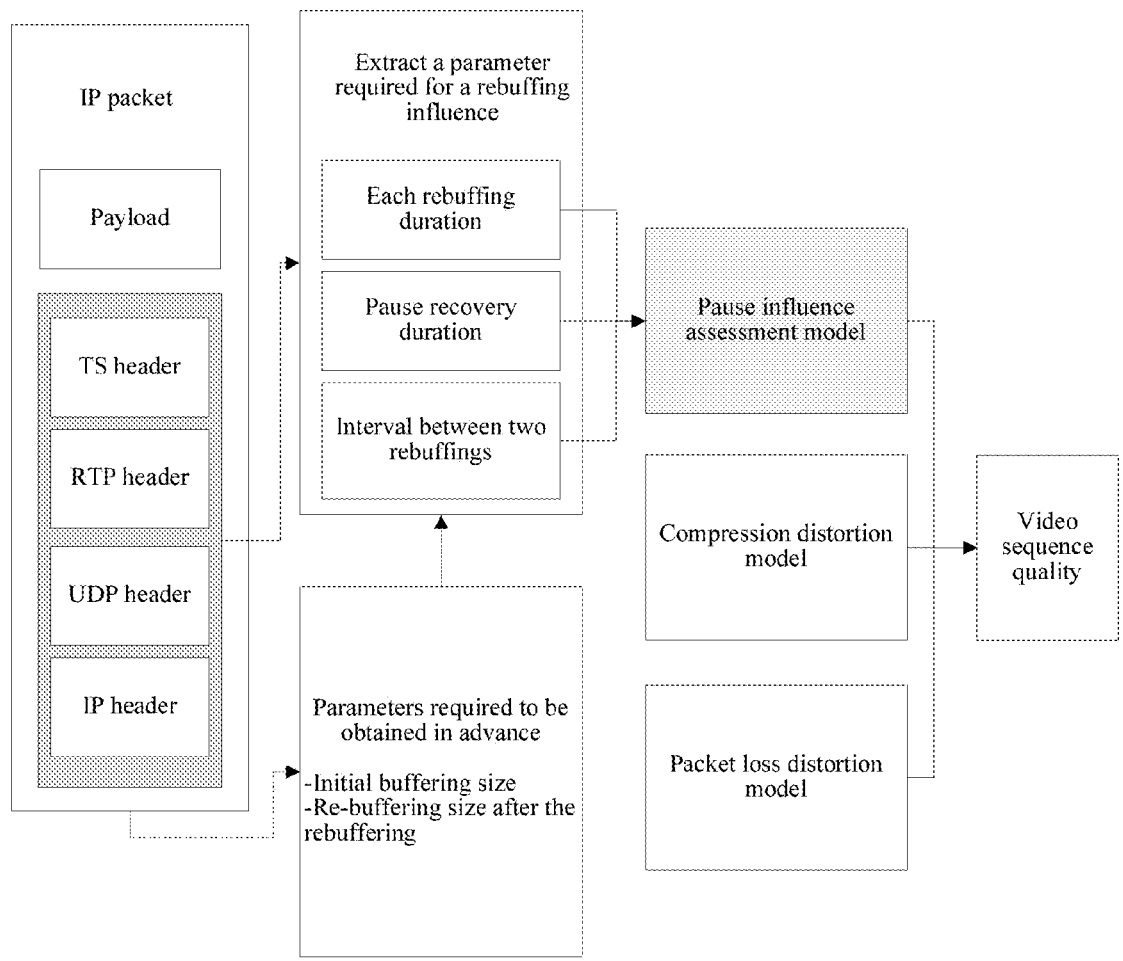
FIG. 17 is a schematic diagram of another calculation model of a video data quality assessment method according to the present invention.

Referring to FIG. 17, the present invention further provides a method for acquiring a rebuffering parameter, and a rebuffering influence assessment model may calculate video sequence quality with reference to the compression distortion model and the packet loss distortion model mentioned in the foregoing embodiment. A compression distortion parameter of video data is obtained, and then a video data rebuffering parameter is obtained; a video quality parameter is a difference between the compression distortion parameter and the video data rebuffering parameter. When a packet loss impairment exists at the same time, the video quality parameter is a difference obtained by subtracting a frame impairment distortion parameter and then subtracting the video data rebuffering parameter from the compression distortion parameter. An influence of the rebuffering does not depend on another impairment factor such as a packet loss, but is relevant to a rebuffering duration, a duration from rebuffering ending time to grading time, and an interval between two adjacent rebufferings. When a rebuffering occurs, quality of a video sequence is decreased (which is recorded as $Q_{stop}$). When the rebuffering ends, the video starts playing, and the quality of the video sequence gradually recovers (which is recorded as $Q_{rec}$). When another rebuffering exists in an interval from a last rebuffering to a current rebuffering, the last rebuffering may have a certain influence on the current rebuffering (a mutual influence between the two rebufferings is recorded as $Q_{cor}$).

Figure 18:
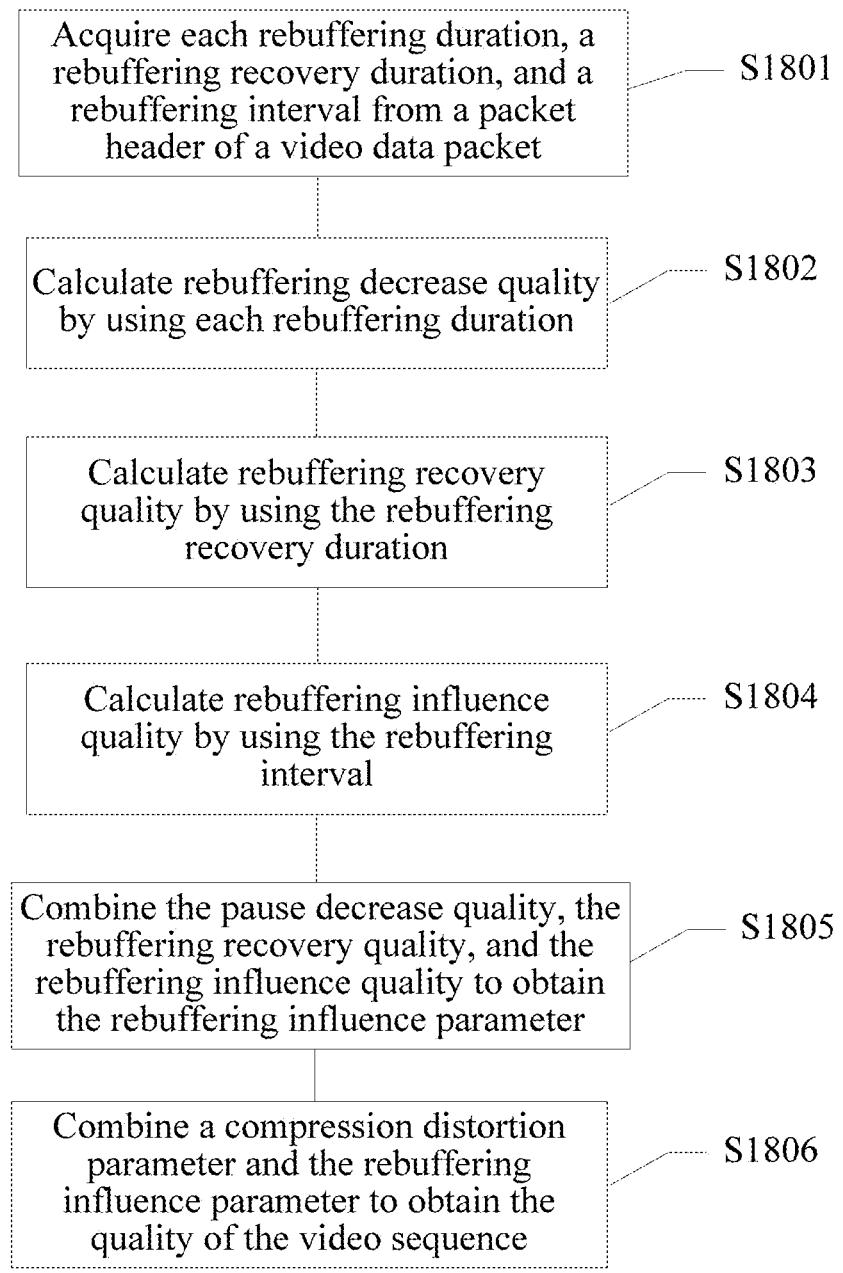
FIG. 18 is a schematic flow chart of an embodiment of acquiring a rebuffering parameter according to the present invention.

Referring to FIG. 18, an embodiment of a method for acquiring a rebuffering parameter in the present invention includes:

S1801: Acquire each rebuffering duration, a rebuffering recovery duration, and a rebuffering interval from a packet header of a video data packet.

S1802: Calculate rebuffering decrease quality by using each rebuffering duration, where the rebuffering decrease quality linearly or nonlinearly increases as the rebuffering duration increases.

A rebuffering duration of one rebuffering is recorded as $t_1$, and the rebuffering decrease quality is as follows:

$$Q_{stop}=\text{func}(t_1) \quad \text{Formula (34)}.$$

In the foregoing formula, the longer the rebuffering duration $t_1$ is, the more greatly the quality decreases. A specific form may be as follows:

$$Q_{stop}=a_8 \cdot t_1^{b_8} \quad \text{Formula (35)}.$$

In Formula (35), $a_8$ is a constant. A rebuffering decrease quality model may also be another linear formula, nonlinear formula, or a combination of another linear formula and nonlinear formula satisfying the foregoing rule.

In another embodiment, a specific form may be as follows:

$$Q_{stop}=a_8 \cdot t_1^2+b_8 \cdot t_1+c_8$$

$$\text{or } Q_{stop}=a_8 \cdot \exp(b_8 \cdot t_1)$$

$$\text{or } Q_{stop}=a_8 \cdot t_1+b_8 \quad \text{Formula (36)},$$

where $a_8$, $b_8$, $c_8$ are constants.

S1803: Calculate rebuffering recovery quality by using the rebuffering recovery duration, where the rebuffering recovery quality linearly or nonlinearly increases as the rebuffering recovery duration increases.

The recovery duration from rebuffering ending time to grading time is recorded as $t_2$, and the rebuffering recovery quality is as follows:

$$Q_{rec}=\text{func}(t_2) \quad \text{Formula (37)}.$$

In the foregoing formula, the longer the recovery duration $t_2$ is, the more highly the quality recovers (it should be ensured that the rebuffering recovery quality does not exceed original quality when no rebuffering occurs). A specific form may be as follows:

$$Q_{rec}=a_9 \cdot t_2^2+b_9 \cdot t_2+c_9 \quad \text{Formula (38)}.$$

In Formula (38), $a_9$, $b_9$, $c_9$ are constants. A rebuffering recovery quality model may also be another linear formula, nonlinear formula, or a combination of another linear formula and nonlinear formula satisfying the foregoing rule.

In another embodiment, a specific form may be as follows:

$$Q_{rec}=a_9 \cdot t_2^{b_9}$$

$$\text{or } Q_{rec}=a_9 \cdot \exp(b_9 \cdot t_2)$$

$$\text{or } Q_{rec}=a_9 \cdot t_2+b_9 \quad \text{Formula (39)},$$

where $a_9$, $b_9$ are constants.

S1804: Calculate rebuffering influence quality by using the rebuffering interval, where the rebuffering influence quality linearly or nonlinearly decreases as the rebuffering interval increases.

If another rebuffering exists in an interval before a current rebuffering, this time is recorded as $t_3$, and quality of a mutual influence between two adjacent rebufferings is as follows:

$$Q_{cor}=\text{func}(t_3) \quad \text{Formula (39)}.$$

In the foregoing formula, the longer the recovery duration $t_3$ is, the smaller the mutual influence quality is. A specific form may be as follows:

$$Q_{cor}=a_{10} \cdot t_3+b_{10} \quad \text{Formula (39)}.$$

In Formula (39), $a_{10}$, $b_{10}$ are constants. A mutual influence quality model of two adjacent rebufferings may also be another linear formula, nonlinear formula, or a combination of another linear formula and nonlinear formula satisfying the foregoing rule.

In another embodiment, a specific form may be as follows:

$$Q_{cor}=a_{10} \cdot t_3^2 + b_{10} \cdot t_3 + c_{10}$$

$$\text{or } Q_{cor}=a_{10} \cdot \exp(b_{10} \cdot t_3)$$

$$\text{or } Q_{cor}=a_{10} \cdot t_3^{b_{10}} \quad \text{Formula (40),}$$

where $a_{10}$, $b_{10}$, $c_{10}$ are constants.

S1805: Combine the rebuffering decrease quality, the rebuffering recovery quality, and the rebuffering influence quality to obtain the rebuffering parameter.

A rebuffering influence model is as follows:

$$Q_{rebuffer} = \text{func}(Q_{stop}, Q_{rec}, Q_{cor}) \quad \text{Formula (41).}$$

An influence of each rebuffering before the grading time is calculated by using the foregoing model, and specific grading time may be time after each video segment ends, time when the video begins to play after each rebuffering, or time when a video sequence ends. A specific model of each rebuffering influence may be as the following formula:

$$Q_{rebuffer\_i} = Q_{stop\_i} - Q_{rec\_i} - Q_{cor\_i} \quad \text{Formula (42).}$$

In another embodiment, a specific form may be as follows:

$$Q_{rebuffer\_i} = Q_{stop\_i} + Q_{rec\_i} + Q_{cor\_i}$$

$$\text{or } Q_{rebuffer\_i} = a \cdot Q_{stop\_i} + b \cdot Q_{rec\_i} + c \cdot Q_{cor\_i} \quad \text{Formula (42).}$$

S1806: Combine a compression distortion parameter and the rebuffering parameter to obtain the quality of the video sequence.

The quality of the video sequence is obtained by subtracting the rebuffering parameter from the compression distortion parameter of the video data:

$$Q_{sequence} = Q_{encoding} - Q_{rebuffer} \quad \text{Formula (43).}$$

When a packet loss occurs at the same time, the quality of the video sequence is obtained by subtracting a frame impairment distortion parameter and the rebuffering parameter from the compression distortion parameter of the video data.

$$Q_{sequence} = Q_{encoding} - Q_{rebuffer} - Q_{framedistortion} \quad \text{Formula (44)}$$

In some application scenarios, for example, when a computational capability of a terminal device (a network device or a test device) is too low, an operating result of each formula involved in this embodiment may be replaced through table look-up.

In this embodiment, if the rebuffering parameter is calculated in consideration of a mutual influence of multiple rebufferings in a period of time, an assessment result is more accurate.

Persons of ordinary skill in the art should understand that, all or a part of processes in the method according to the foregoing embodiments may be implemented by a computer program instructing relevant hardware. The program may be stored in a computer readable storage medium. When the program is executed, the processes of the method according to the embodiments are performed. The storage medium may be a magnetic disk, an optical disk, a read-only memory (ROM), or a random access memory (RAM), or the like.

Figure 19:
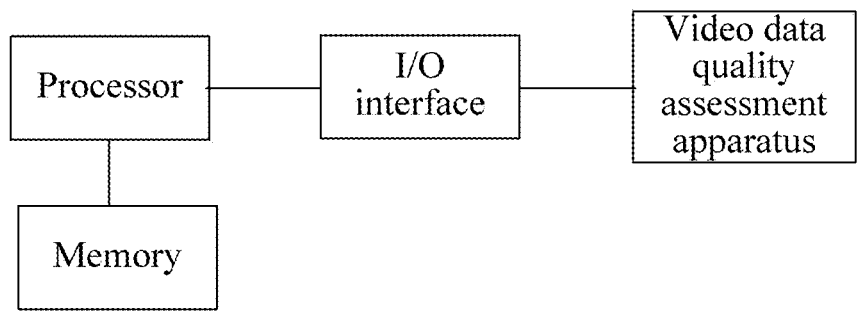
FIG. 19 is a schematic structural diagram of an embodiment of a video data quality assessment apparatus according to the present invention.

Associated with the foregoing method embodiments, the present invention further provides a video data quality assessment apparatus, and the apparatus may be located in a terminal device, a network device, or a test device. The video data quality assessment apparatus may be implemented by using a hardware circuit or through cooperation of software and hardware. For example, referring to FIG. 19, a video data quality assessment is implemented by using a processor to invoke the video data quality assessment apparatus. The video data quality assessment apparatus may execute various methods and procedures in the foregoing method embodiments.

Figure 20:
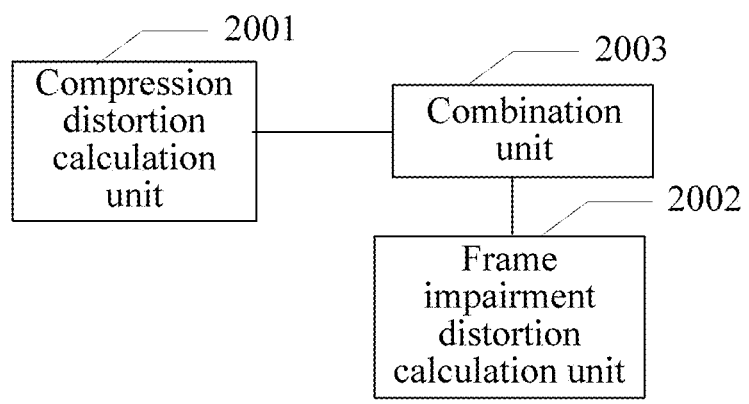
FIG. 20 is a schematic structural diagram of another embodiment of a video data quality assessment apparatus according to the present invention.

Referring to FIG. 20, an embodiment of a video data quality assessment apparatus includes: a compression distortion calculation unit 2001 configured to acquire a compression distortion parameter of video data; a frame impairment distortion calculation unit 2002 configured to acquire a frame impairment distortion parameter; and a combination unit 2003 configured to calculate a video quality parameter according to the compression distortion parameter and the frame impairment distortion parameter, where the video quality parameter is a difference between the compression distortion parameter and the frame impairment distortion parameter.

Figure 21:
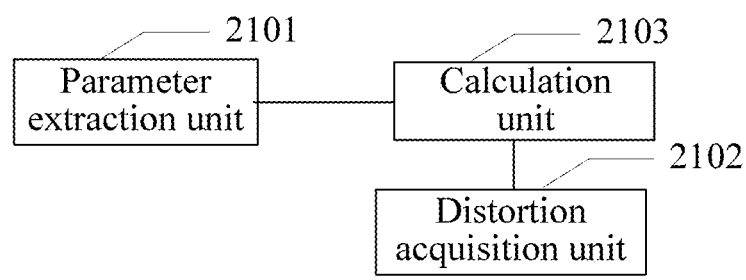
FIG. 21 is a schematic structural diagram of an embodiment of a frame impairment distortion calculation unit according to the present invention.

Referring to FIG. 21, the frame impairment distortion calculation unit 2002 includes: a parameter extraction unit 2101 configured to derive a proportion of impaired frames, an average impairment degree of impaired frames, and an impairment frequency from a packet header of a video data packet; a distortion acquisition unit 2102 configured to acquire the compression distortion parameter of the video data; and a calculation unit 2103 configured to calculate the frame impairment distortion parameter of the video data by using the compression distortion parameter, the proportion of impaired frames, the average impairment degree of impaired frames, and the impairment frequency, where the frame impairment distortion parameter is between 0 and a difference between the compression distortion parameter and a minimum quality value, and the video frame impairment distortion parameter decreases to the minimum quality value as any one of the proportion of impaired frames, the average impairment degree of impaired frames, and the impairment frequency increases.

Figure 22:
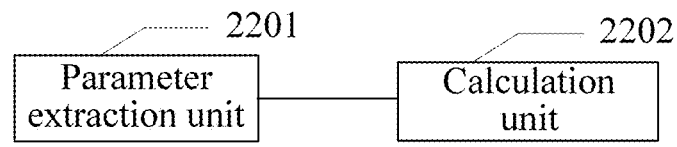
FIG. 22 is a schematic structural diagram of an embodiment of a compression distortion calculation unit according to the present invention.

Referring to FIG. 22, in an embodiment, the compression distortion calculation unit 2102 includes: a parameter extraction unit 2201 configured to acquire a bit rate and a frame rate of a video stream; and a calculation unit 2202 configured to calculate a video compression distortion parameter according to the bit rate and the frame rate of the video stream, where the compression distortion parameter increases to a maximum value as the bit rate increases; and under a certain bit rate, the compression distortion parameter decreases as the frame rate increases.

Referring to FIG. 22, in another embodiment, the compression distortion calculation unit 2102 includes: a parameter extraction unit 2201 configured to acquire a bit rate, a frame rate, and video content complexity of a video stream; and a calculation unit 2202 configured to calculate a video compression distortion parameter according to the bit rate, the frame rate, and the video content complexity of the video stream, where the compression distortion parameter increases to a maximum value as the bit rate increases and decreases as the video content complexity increases; and under a certain bit rate, the compression distortion parameter decreases as the frame rate increases.

Further, the video data quality assessment apparatus also includes: a video content temporal complexity extraction unit configured to acquire video content temporal complexity, where the video frame impairment distortion parameter increases as the video content temporal complexity increases.

Figure 23:
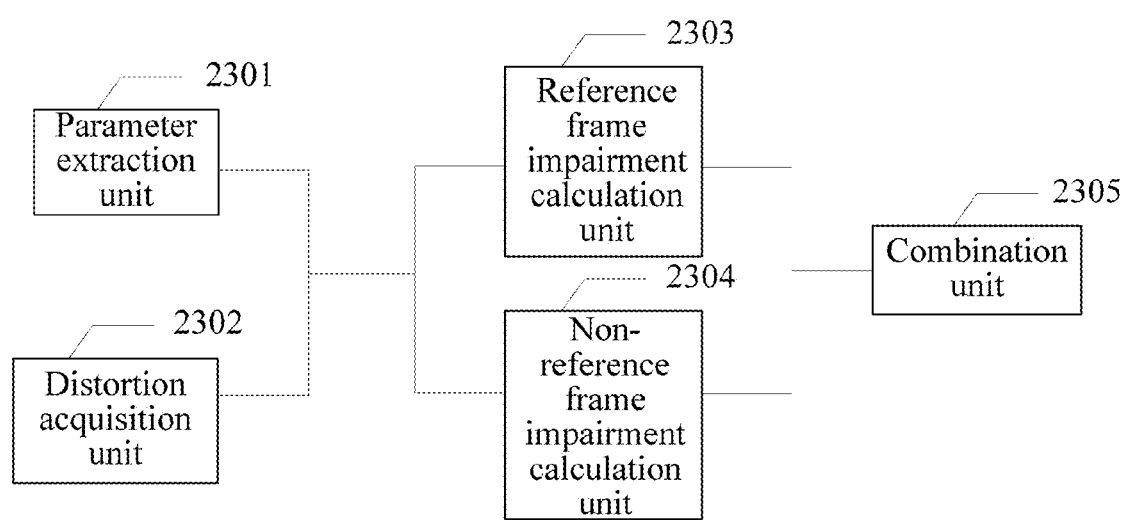
FIG. 23 is a schematic structural diagram of another embodiment of a frame impairment distortion calculation unit according to the present invention.

Referring to FIG. 23, in another embodiment, the frame impairment distortion calculation unit 2002 includes:

A parameter extraction unit 2301 is configured to acquire the number of frames to be affected due to bit error propagation of each reference frame in a video segment in each video segment of a video sequence and an impairment proportion, the number of non-reference frames with a packet loss in the video segment, and a packet loss impairment proportion from a packet header of the video data packet;

A distortion acquisition unit 2302 is configured to acquire the compression distortion parameter of the video data; and A reference frame impairment calculation unit 2303 is configured to calculate distortion caused by a packet loss impairment of a reference frame by using the number of frames to be affected due to bit error propagation of each reference frame in the video segment and the impairment proportion; where the distortion caused by the packet loss impairment of the reference frame increases as any one of the number of frames to be affected due to bit error propagation and the impairment proportion increases.

The calculating the distortion caused by the packet loss impairment of the reference frame includes: calculating distortion caused by a packet loss impairment of each reference frame: $D_{ref\_i}=(Q_{encoding_i}-a_1) \times func1(x_1) \cdot func2(x_2)$; where $a_1$ is a constant and represents a lowest mark of a video, $x_1$ represents the number of frames behind this reference frame and before an end of the video segment, $x_2$ represents the packet loss impairment proportion of this reference frame; $func1(x_1)$ represents a distortion influence factor caused on the video segment if a whole frame of this reference frame is lost or a frame header is lost, and $func1(x_1)$ needs to increase as $x_1$ increases; and $func2(x_2)$ represents different subjective distortion degree influence factors caused by different packet loss impairment proportions of the frame, and $func2(x_2)$ needs to increase as $x_2$ increases; and combining packet loss impairment distortion of an impaired reference frame in the video segment to obtain the distortion caused by the packet loss impairment of the reference frame.

A non-reference frame impairment calculation unit 2304 is configured to calculate distortion caused by a packet loss impairment of a non-reference frame by using the number of non-reference frames with a packet loss and the packet loss impairment proportion.

The distortion caused by the packet loss impairment of the non-reference frame is calculated according to the following formula:

$$D_{non\_ref}=func(B_{dist\_percent\_i}, M),$$

where $D_{non\_ref}$ represents distortion caused by a packet loss impairment of a non-reference frame; $B_{dist\_percent\_i}$ represents a distance between an impaired location and an area that human eyes focus on, and M represents the number of non-reference frames with a packet loss; where the larger the number of non-reference frames with a packet loss is, the closer the impaired location to the area that human eyes focus on is, and the greater the packet loss impairment of the non-reference frame is.

A combination unit 2305 is configured to combine the distortion caused by the packet loss impairment of the reference frame and the distortion caused by the packet loss impairment of the non-reference frame to obtain the frame impairment distortion parameter.

Exemplary logic blocks, modules, and circuits related to the embodiments of the present invention may be constructed or implemented by the following apparatuses: a general processor, a digital signal processor (DSP), an application-specific integrated circuit (ASIC), a field programmable gate array (FPGA) or other programmable logical apparatuses, a discrete door or a transistor logic, a discrete hardware component, or any combination designed and configured to implement the functions described above. The general processor may be a microprocessor, but another choice is that, the processor may also be any regular processor, controller, microcontroller, or state machine. The processor may also be constructed as a combination of calculation apparatuses, and for example, a combination of the DSP and the microprocessor, a combination of multiple microprocessors, a combination of one or more microprocessors and a DSP core, or any other such configuration.

The foregoing description is merely some embodiments of the present invention, and persons skilled in the art may make various modifications and transformations to the present invention according to the application document disclosure without departing from the spirit and scope of the present invention.

What is claimed is:

1. A video data quality assessment method, comprising:
   acquiring a compression distortion parameter of video data according to packet header information of a video data packet;
   acquiring a frame impairment distortion parameter according to the packet header information of the video data packet; and
   calculating a video quality parameter according to the compression distortion parameter and the frame impairment distortion parameter,
   wherein the video quality parameter comprises a difference between the compression distortion parameter and the frame impairment distortion parameter,
   wherein acquiring the compression distortion parameter of the video data comprises:
   acquiring a bit rate and a frame rate of a video stream; and
   calculating the compression distortion parameter according to the bit rate and the frame rate of the video stream,
   wherein the compression distortion parameter increases to approach a maximum value as the bit rate increases, and
   wherein the compression distortion parameter, under the bit rate, decreases as the frame rate increases.

2. The method according to claim 1, wherein acquiring the frame impairment distortion parameter comprises:
   parsing video parameters from a packet header of the video data packet to derive a proportion of impaired frames, an average impairment degree of impaired frames, and an impairment frequency;
   acquiring the compression distortion parameter of the video data; and
   calculating the frame impairment distortion parameter of the video data by using the compression distortion parameter, the proportion of impaired frames, the average impairment degree of impaired frames, and the impairment frequency,
   wherein the frame impairment distortion parameter is between 0 and a difference between the compression distortion parameter and a minimum quality value, and
   wherein the video quality parameter decreases to the minimum quality value as any one of the proportion of impaired frames, the average impairment degree of impaired frames, and the impairment frequency increases.

3. The method according to claim 2, wherein the frame impairment distortion parameter is calculated according to the following formula:

$$Q_{framedistortion}=(Q_{encoding}-a_1) \times f(x,y,FLF),$$

wherein $Q_{framedistortion}$ represents the frame impairment distortion parameter, wherein $Q_{encoding}$ represents the compression distortion parameter, wherein $a_1$ is a constant and represents minimum quality of a video sequence, wherein f(x, y, FLF) represents a function formed by a proportion x of impaired frames, an average impairment degree y of impaired frames, and the impairment frequency, and wherein the function satisfies a relationship of 0≤f(x, y, FLF)<1, and increases and is infinitely close to 1 as any one of the proportion x of impaired frames, the average impairment degree y of impaired frames, and the impairment frequency in FLF increases.

4. The method according to claim 3, wherein the f(x, y, FLF) is a quadratic polynomial formed by x, y, FLF, or a combination of a power function or an exponential function.

5. The method according to claim 2, further comprising acquiring video content temporal complexity, and wherein the video frame impairment distortion parameter increases as the video content temporal complexity increases.

6. The method according to claim 5, wherein the frame impairment distortion parameter is calculated according to the following formula:

$$Q_{framedistortion}(Q_{encoding}-a_1) \times f(x,y,FLF,\sigma),$$

wherein $Q_{framedistortion}$ represents the frame impairment distortion parameter, wherein $Q_{encoding}$ represents the compression distortion parameter, wherein $a_1$ is a constant and represents minimum quality of a video sequence, wherein f(x, y, FLF, σ) represents a function formed by a proportion x of impaired frames, an average impairment degree y of impaired frames, and an impairment frequency, and wherein the function satisfies a relationship of 0≤f(x, y, FLF, σ)<1, and increases and is infinitely close to 1 as any one of the proportion x of impaired frames, the average impairment degree y of impaired frames, and the impairment frequency in FLF increases, and increases as the video content temporal complexity increases.

7. The method according to claim 6, wherein the f(x, y, FLF, σ) is a quadratic polynomial formed by x, y, FLF, σ, or a combination of a power function or an exponential function.

8. The method according to claim 1, wherein acquiring the frame impairment distortion parameter comprises:

acquiring the number of frames to be affected due to bit error propagation of each reference frame in a video segment in each video segment of a video sequence and an impairment proportion, the number of non-reference frames with a packet loss in the video segment, and a packet loss impairment proportion from a packet header of a video data packet;

acquiring the compression distortion parameter of the video data;

calculating distortion caused by a packet loss impairment of a reference frame by using the number of frames to be affected due to bit error propagation of each reference frame in the video segment and the impairment proportion, wherein the distortion caused by the packet loss impairment of the reference frame increases as any one of the number of frames to be affected due to bit error propagation and the impairment proportion increases;

calculating distortion caused by a packet loss impairment of a non-reference frame by using the number of non-reference frames with a packet loss and the packet loss impairment proportion; and combining the distortion caused by the packet loss impairment of the reference frame and the distortion caused by the packet loss impairment of the non-reference frame to obtain the frame impairment distortion parameter.

9. The method according to claim 8, wherein calculating the distortion caused by the packet loss impairment of the reference frame comprises:

calculating distortion caused by a packet loss impairment of each reference frame according to the following formula:

$$D_{ref\_i}=(Q_{encoding}-a_1) \times \text{func1}(x_1) \cdot \text{func2}(x_2),$$

wherein $a_1$ is a constant and represents a lowest mark of a video, wherein $x_1$ represents the number of frames behind this reference frame and before an end of the video segment, wherein $x_2$ represents the packet loss impairment proportion of this reference frame, wherein func1($x_1$) represents a distortion influence factor caused on the video segment if a whole frame of this reference frame is lost or a frame header is lost, and func1($x_1$) needs to increase as $x_1$ increases, and wherein func2($x_2$) represents different subjective distortion degree influence factors caused by different packet loss impairment proportions of the frame, and func2($x_2$) needs to increase as $x_2$ increases; and combining packet loss impairment distortion of an impaired reference frame in the video segment to obtain the distortion caused by the packet loss impairment of the reference frame.

10. The method according to claim 9, wherein the distortion caused by the packet loss impairment of the non-reference frame is calculated according to the following formula:

$$D_{non\_ref}=\text{func}(B_{dist\_percent\_i},M),$$

wherein $D_{non\_ref}$ represents distortion caused by a packet loss impairment of a non-reference frame, wherein $B_{dist\_percent\_i}$ represents a distance between an impaired location and an area that human eyes focus on, wherein M represents the number of non-reference frames with a packet loss, and wherein the larger the number of non-reference frames with a packet loss is, the closer the impaired location to the area that human eyes focus on is, and the greater the packet loss impairment of the non-reference frame is.

11. The method according to claim 9, further comprising acquiring video content temporal complexity, and wherein the video frame impairment distortion parameter increases as the video content temporal complexity increases.

12. The method according to claim 11, wherein acquiring the distortion caused by the packet loss impairment of the reference frame comprises:

calculating distortion caused by a packet loss impairment of each reference frame according to the following formula:

$$D_{ref\_i}=(Q_{encoding_i}-a_1) \times \text{func1}(x_1 \cdot \sigma) \cdot \text{func2}(x_2),$$

wherein $a_1$ is a constant and represents the lowest mark of the video, wherein $x_1$ represents the number of frames behind this reference frame and before an end of the video segment, wherein $x_2$ represents the packet loss impairment proportion of this reference frame, wherein func1($x_1 \cdot \sigma$) is a function relevant to the number of frames propagated by a bit error and the video content temporal complexity, and func1($x_1 \cdot \sigma$) needs to increase as $x_1$ and $\sigma$ increase, and wherein func2($x_2$) represents different subjective distortion degree influence factors caused by different packet loss impairment proportions of the frame, and func2($x_2$) increases as $x_2$ increases; and combining packet loss impairment distortion of an impaired reference frame in the video segment to obtain the distortion caused by the packet loss impairment of the reference frame.

13. The method according to claim 11, wherein the distortion caused by the packet loss impairment of the non-reference frame is calculated according to the following formula:

$$D_{non\_ref} = \text{func}(B_{dist_{percent_i}}, M, \sigma),$$

wherein $D_{non\_ref}$ represents distortion caused by a packet loss impairment of a non-reference frame, wherein $B_{dist_{percent_i}}$ represents a distance between an impaired location and an area that human eyes focus on, wherein M represents the number of non-reference frames with a packet loss, wherein $\sigma$ represents the video content temporal complexity, and wherein the larger the number of non-reference frames with a packet loss is, the closer the impaired location to the area that human eyes focus on is, the higher the video content temporal complexity $\sigma$ is, and the greater a distortion value is.

14. A video data quality assessment method, comprising:
acquiring a compression distortion parameter of video data according to packet header information of a video data packet;
acquiring a frame impairment distortion parameter according to the packet header information of the video data packet; and
calculating a video quality parameter according to the compression distortion parameter and the frame impairment distortion parameter,
wherein the video quality parameter comprises a difference between the compression distortion parameter and the frame impairment distortion parameter,
wherein acquiring the compression distortion parameter of the video data comprises:
acquiring a bit rate, a frame rate, and video content complexity of a video stream; and
calculating the compression distortion parameter according to the bit rate, the frame rate, and the video content complexity of the video stream,
wherein the compression distortion parameter increases to a maximum value as the bit rate increases, and decreases as the video content complexity increases, and wherein the compression distortion parameter, under the bit rate, decreases as the frame rate increases.

15. A video data quality assessment method, comprising:
acquiring a compression distortion parameter of video data according to packet header information of a video data packet;
acquiring a video data rebuffering parameter according to the packet header information of the video data packet;
acquiring a frame impairment distortion parameter according to the packet header information of the video data packet; and
calculating a video quality parameter according to the compression distortion parameter, the video data rebuffering parameter and the frame impairment distortion parameter,
wherein the video quality parameter is a difference obtained by subtracting the frame impairment distortion parameter and the video data rebuffering parameter from the compression distortion parameter.

16. The method according to claim 15, wherein acquiring the video data rebuffering parameter comprises:
acquiring each rebuffering duration, a rebuffering recovery duration, and a rebuffering interval from a packet header of the video data packet;
calculating rebuffering decrease quality by using each rebuffering duration, wherein the rebuffering decrease quality linearly or nonlinearly increases as the rebuffering duration increases;
calculating rebuffering recovery quality by using the rebuffering recovery duration, wherein the rebuffering recovery quality linearly or nonlinearly increases as the rebuffering recovery duration increases;
calculating rebuffering influence quality by using the rebuffering interval, wherein the rebuffering influence quality linearly or nonlinearly decreases as the rebuffering interval increases; and
combining the rebuffering decrease quality, the rebuffering recovery quality, and the rebuffering influence quality to obtain the rebuffering parameter.

17. The method according to claim 16, wherein the rebuffering decrease quality comprises a linear function, a binomial function, a power function, or an exponential function of the rebuffering duration.

18. The method according to claim 16, wherein the rebuffering recovery quality comprises a linear function, a binomial function, a power function, or an exponential function of the recovery duration.

19. The method according to claim 16, wherein the rebuffering influence quality comprises a linear function, a binomial function, a power function, or an exponential function of the rebuffering interval.

20. A video data quality assessment apparatus, comprising:
a compression distortion calculation unit configured to acquire a compression distortion parameter of video data according to packet header information of a video data packet;
a frame impairment distortion calculation unit configured to acquire a frame impairment distortion parameter according to the packet header information of the video data packet; and
a combination unit configured to calculate a video quality parameter according to the compression distortion parameter and the frame impairment distortion parameter,
wherein the video quality parameter comprises a difference between the compression distortion parameter and the frame impairment distortion parameter, wherein the compression distortion calculation unit comprises:
  a parameter extraction unit configured to acquire a bit rate and a frame rate of a video stream; and
  a calculation unit configured to calculate the compression distortion parameter according to the bit rate and the frame rate of the video stream,
  wherein the compression distortion parameter increases to approach a maximum value as the bit rate increases, and
  wherein the compression distortion parameter decreases, under the bit rate, as the frame rate increases.

21. The apparatus according to claim 20, wherein the frame impairment distortion calculation unit comprises:
  a parameter extraction unit configured to parse video parameters from a packet header of the video data packet to derive a proportion of impaired frames, an average impairment degree of impaired frames, and an impairment frequency;
  a distortion acquisition unit configured to acquire the compression distortion parameter of the video data; and
  a calculation unit configured to calculate the frame impairment distortion parameter of the video data by using the compression distortion parameter, the proportion of impaired frames, the average impairment degree of impaired frames, and the impairment frequency,
  wherein the frame impairment distortion parameter is between 0 and a difference between the compression distortion parameter and a minimum quality value, and
  wherein the quality parameter decreases to the minimum quality value as any one of the proportion of impaired frames, the average impairment degree of impaired frames, and the impairment frequency increases.

22. The apparatus according to claim 20, further comprising a video content temporal complexity extraction unit configured to acquire video content temporal complexity, and wherein the video frame impairment distortion parameter increases as the video content temporal complexity increases.

23. The apparatus according to claim 20, wherein the frame impairment distortion calculation unit comprises:
  a parameter extraction unit configured to acquire the number of frames to be affected due to bit error propagation of each reference frame in a video segment in each video segment of a video sequence and an impairment proportion, the number of non-reference frames with a packet loss in the video segment, and a packet loss impairment proportion from a packet header of the video data packet;
  a distortion acquisition unit configured to acquire the compression distortion parameter of the video data; and
  a reference frame impairment calculation unit configured to calculate distortion caused by a packet loss impairment of a reference frame by using the number of frames to be affected due to bit error propagation of each reference frame in the video segment and the impairment proportion, wherein the distortion caused by the packet loss impairment of the reference frame increases as any one of the number of frames to be affected due to bit error propagation and the impairment proportion increases;
  a non-reference frame impairment calculation unit configured to calculate distortion caused by a packet loss impairment of a non-reference frame by using the number of non-reference frames with a packet loss and the packet loss impairment proportion; and
  a combination unit configured to combine the distortion caused by the packet loss impairment of the reference frame and the distortion caused by the packet loss impairment of the non-reference frame to obtain the frame impairment distortion parameter.

24. The apparatus according to claim 23, wherein calculating the distortion caused by the packet loss impairment of the reference frame comprises:
  calculating distortion caused by a packet loss impairment of each reference frame according to the following formula:

$$D_{ref\_i} = (Q_{encoding_i} - a_1) \times func1(x_1) func2(x_2),$$

wherein $a_1$ is a constant and represents a lowest mark of a video,
  wherein $x_1$ represents the number of frames behind this reference frame and before an end of the video segment,
  wherein $x_2$ represents the packet loss impairment proportion of this reference frame,
  wherein $func1(x_1)$ represents a distortion influence factor caused on the video segment if a whole frame of this reference frame is lost or a frame header is lost, and $func1(x_1)$ needs to increase as $x_1$ increases, and
  wherein $func2(x_2)$ represents different subjective distortion degree influence factors caused by different packet loss impairment proportions of the frame, and $func2(x_2)$ needs to increase as $x_2$ increases; and
  combining packet loss impairment distortion of an impaired reference frame in the video segment to obtain the distortion caused by the packet loss impairment of the reference frame.

25. The apparatus according to claim 23, wherein the distortion caused by the packet loss impairment of the non-reference frame is calculated according to the following formula:

$$D_{non\_ref} = func(B_{dist\_percent\_i}, M),$$

wherein $D_{non\_ref}$ represents distortion caused by a packet loss impairment of a non-reference frame,
  wherein $B_{dist\_percent\_i}$ represents a distance between an impaired location and an area that human eyes focus on,
  wherein M represents the number of non-reference frames with a packet loss, and
  wherein the larger the number of non-reference frames with a packet loss is, the closer the impaired location to the area that human eyes focus on is, and the greater the packet loss impairment of the non-reference frame is.

26. The apparatus according to claim 23, further comprising a video content temporal complexity extraction unit configured to acquire video content temporal complexity, and wherein the video frame impairment distortion parameter increases as the video content temporal complexity increases.

27. A video data quality assessment apparatus, comprising:
  a compression distortion calculation unit configured to acquire a compression distortion parameter of video data according to racket header information of a video data packet;
  a frame impairment distortion calculation unit configured to acquire a frame impairment distortion parameter according to the packet header information of the video data packet; and
  a combination unit configured to calculate a video quality parameter according to the compression distortion parameter and the frame impairment distortion parameter, wherein the video quality parameter comprises a difference between the compression distortion parameter and the frame impairment distortion parameter, wherein the compression distortion calculation unit comprises:

a parameter extraction unit configured to acquire a bit rate, a frame rate, and video content complexity of a video stream; and a calculation unit configured to calculate the compression distortion parameter according to the bit rate, the frame rate, and the video content complexity of the video stream, wherein the compression distortion parameter increases to a maximum value as the bit rate increases and decreases as the video content complexity increases, and wherein the compression distortion parameter, under the bit rate, decreases as the frame rate increases.

* * * * *